(12) United States Patent
Alonso Lopez et al.

(10) Patent No.: US 11,640,764 B1
(45) Date of Patent: May 2, 2023

(54) OPTIMAL OCCUPANCY DISTRIBUTION FOR ROUTE OR PATH PLANNING

(71) Applicant: Amazon Technologies, Inc., Seattle, WA (US)

(72) Inventors: Javier Alonso Lopez, Edmonds, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 281 days.

(21) Appl. No.: 16/889,380

(22) Filed: Jun. 1, 2020

(51) Int. Cl.
   *G08G 5/00* (2006.01)
   *B64C 39/02* (2006.01)
   *G05D 1/10* (2006.01)

(52) U.S. Cl.
   CPC ......... *G08G 5/0034* (2013.01); *B64C 39/024* (2013.01); *G05D 1/106* (2019.05); *G08G 5/0069* (2013.01); *B64C 2201/027* (2013.01); *B64C 2201/141* (2013.01)

(58) Field of Classification Search
   CPC .................................................... G08G 5/0034
   See application file for complete search history.

(56) References Cited

U.S. PATENT DOCUMENTS

| | | | |
|---|---|---|---|
| 9,262,929 B1* | 2/2016 | Roy ..................... | G08G 5/0034 |
| 9,518,821 B2 | 12/2016 | Malay | |
| 9,542,849 B1 | 1/2017 | Bertram et al. | |
| 9,592,912 B1 | 3/2017 | Michini et al. | |
| 9,594,372 B1 | 3/2017 | Sills et al. | |
| 9,773,418 B1* | 9/2017 | Smith ................... | G08G 5/0043 |
| 9,817,396 B1 | 11/2017 | Takayama et al. | |
| 9,849,981 B1 | 12/2017 | Burgess et al. | |
| 9,953,540 B2* | 4/2018 | Macfarlane .......... | G05D 1/0011 |

(Continued)

FOREIGN PATENT DOCUMENTS

| | | | | |
|---|---|---|---|---|
| CN | 108594858 B | * | 10/2020 | ............. G05D 1/101 |
| EP | 3251108 A1 | * | 12/2017 | ........... B64C 39/024 |

(Continued)

OTHER PUBLICATIONS

Dobson, James, E., LandScan: A Global Population Database for Estimating Populations at Risk, Photogrammetric Engineering and Remote Sensing • Jul. 2000 (https://www.researchgate.net/profile/Jerome-Dobson/publication/267450852_LandScan_A_Global_Population_Database_for_Estimating_Populations_at_Risk/links/5cdd754e4.*

(Continued)

*Primary Examiner* — Jean Paul Cass
(74) *Attorney, Agent, or Firm* — Athorus, PLLC

(57) ABSTRACT

An occupancy map of a region is generated for a vehicle by dividing the region into cells and calculating occupancy metrics for each of the cells based on building footprints or other data. Cells having high occupancy metrics are labeled as obstructed, and cells having low occupancy metrics are labeled as free of obstructions. Cells that may not be labeled as obstructed or free based on their occupancy metrics are subdivided, and occupancy metrics are calculated for cells formed from the subdivision. Occupancy metrics may be calculated for cells, and the cells may be subdivided, for as long as the cells formed from the subdivision have areas greater than an area defined based on operational capabilities of the vehicle. The occupancy map is used to determine routes through the region for the vehicle.

18 Claims, 27 Drawing Sheets

(56) References Cited

U.S. PATENT DOCUMENTS

| | | |
|---|---|---|
| 10,102,758 B1 | 10/2018 | Beaurepaire et al. |
| 11,094,202 B2 | 8/2021 | Gong et al. |
| 2002/0077876 A1 | 6/2002 | O'Meara et al. |
| 2009/0210109 A1 | 8/2009 | Ravenscroft |
| 2012/0158280 A1 | 6/2012 | Ravenscroft |
| 2014/0018979 A1 | 1/2014 | Goossen et al. |
| 2014/0188748 A1 | 7/2014 | Cavoue et al. |
| 2014/0330741 A1 | 11/2014 | Bialynicka-Birula et al. |
| 2015/0148988 A1 | 5/2015 | Fleck |
| 2015/0153740 A1 | 6/2015 | Ben-Shachar et al. |
| 2016/0050840 A1 | 2/2016 | Sauder et al. |
| 2016/0202074 A1 | 7/2016 | Woodard et al. |
| 2017/0162059 A1* | 6/2017 | Jarrell ............... G05D 1/101 |
| 2017/0178352 A1 | 6/2017 | Harmsen et al. |
| 2018/0025649 A1 | 1/2018 | Contreras et al. |
| 2018/0068567 A1 | 3/2018 | Gong et al. |
| 2018/0156616 A1 | 6/2018 | Bennett et al. |
| 2019/0019423 A1 | 1/2019 | Choi et al. |
| 2019/0287307 A1 | 9/2019 | Rogers et al. |
| 2020/0258400 A1 | 8/2020 | Yuan et al. |
| 2020/0364456 A1 | 11/2020 | Tran et al. |
| 2020/0379118 A1 | 12/2020 | Reid et al. |
| 2021/0089055 A1 | 3/2021 | Tran |
| 2021/0163068 A1 | 6/2021 | Zhu et al. |
| 2021/0165426 A1 | 6/2021 | White |
| 2021/0173414 A1 | 6/2021 | Starr et al. |
| 2021/0173415 A1 | 6/2021 | Cajias et al. |
| 2021/0225176 A1* | 7/2021 | Kusumi ............ G08G 5/0026 |

FOREIGN PATENT DOCUMENTS

| | | | |
|---|---|---|---|
| EP | 3251108 A1 | 12/2017 | |
| EP | 3792896 A1 | 3/2021 | |
| WO | 2016122780 A1 | 8/2016 | |
| WO | 2019099912 A1 | 5/2019 | |
| WO | 2019133049 A1 | 7/2019 | |
| WO | WO-2019133048 A1 * | 7/2019 | ........... H04B 17/318 |

OTHER PUBLICATIONS

Dobson, James, E. et al., "LandScan: A Global Population Database for Estimating Populations at Risk," Photogrammetric Engineering and Remote Sensing, vol. 66, No. 7, American Society for Photogrammetry and Remote Sensing, Jul. 2000, URL: https://www.researchgate.net/publication/267450852_LandScan_A_Global_Population_Database_for_Estimating_Populations_at_Risk, pp. 849-857, 10 pages.

Ibrahim, M., and M. Youssef, (Jun. 1, 2011), "A Hidden Markov Model for Localization Using Low-End GSM Cell Phones", 2011 IEEE International Conference on Communications Proceedings, IEEE Communications Society, URL: http://www.winlab.rutgers.edu/~mibrahim/papers/cellsense-icc2011.pdf, 5 pages.

Liu, Yecheng and Yongjia Zhao, "A Virtual-Waypoint Based Arlilicial Potential Field Method for UAV Path Planning," Proceedings of 2016 IEEE Chinese Guidance, Navigation and Control Conference (CGNCC), August 12-14, Nanjing, China (URL: https://ieeexplore.ieee.org/abstract/document/7828913).

* cited by examiner

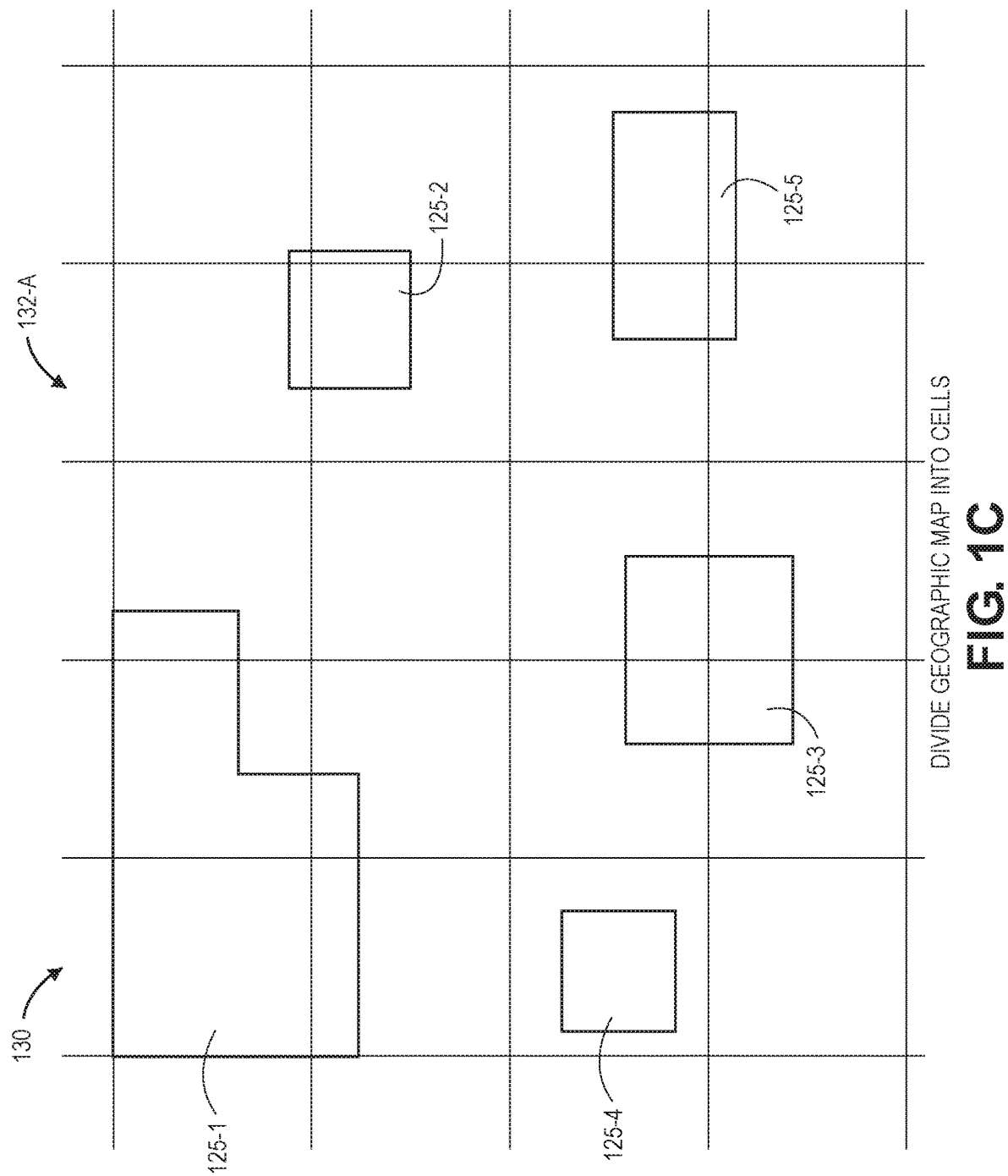

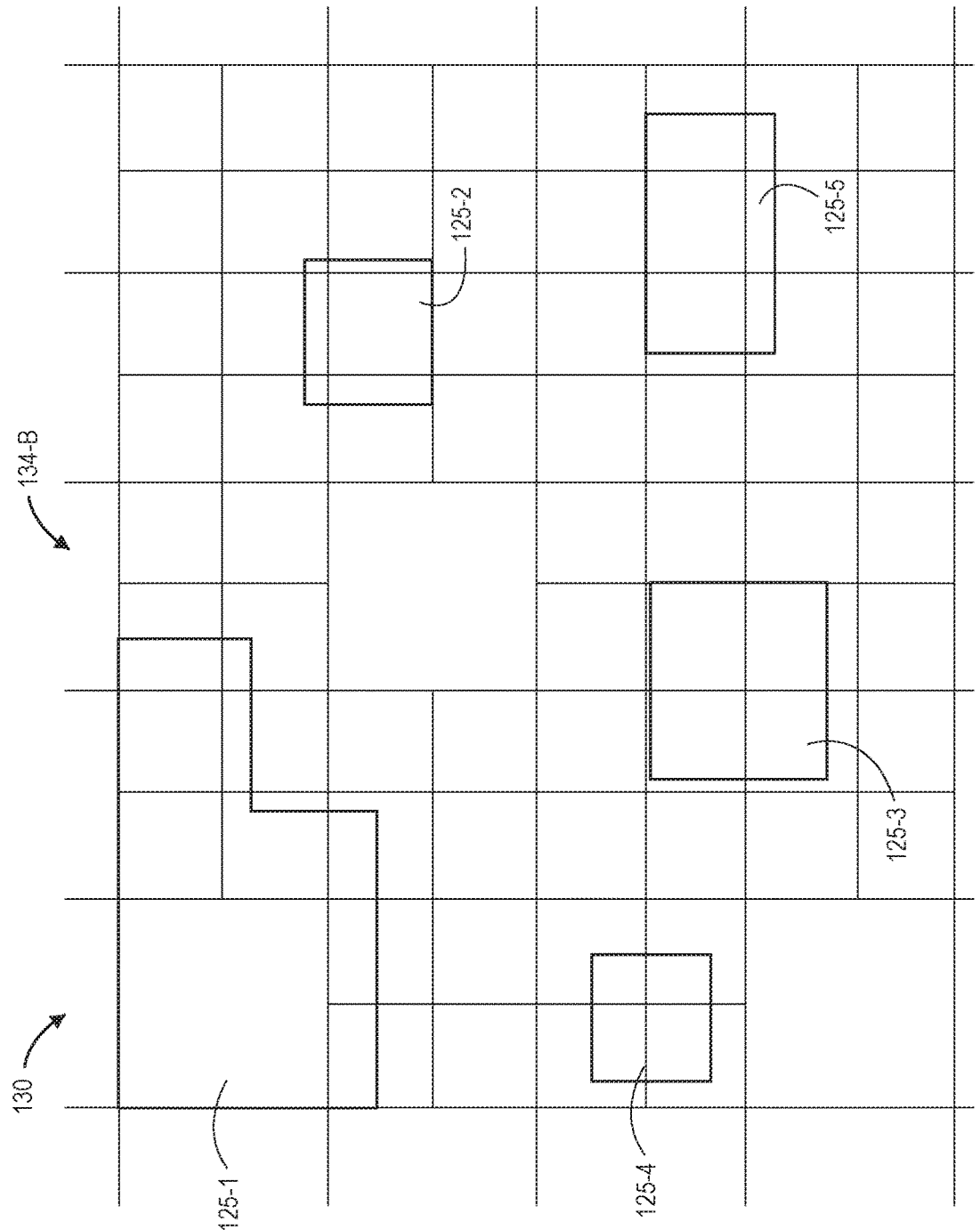

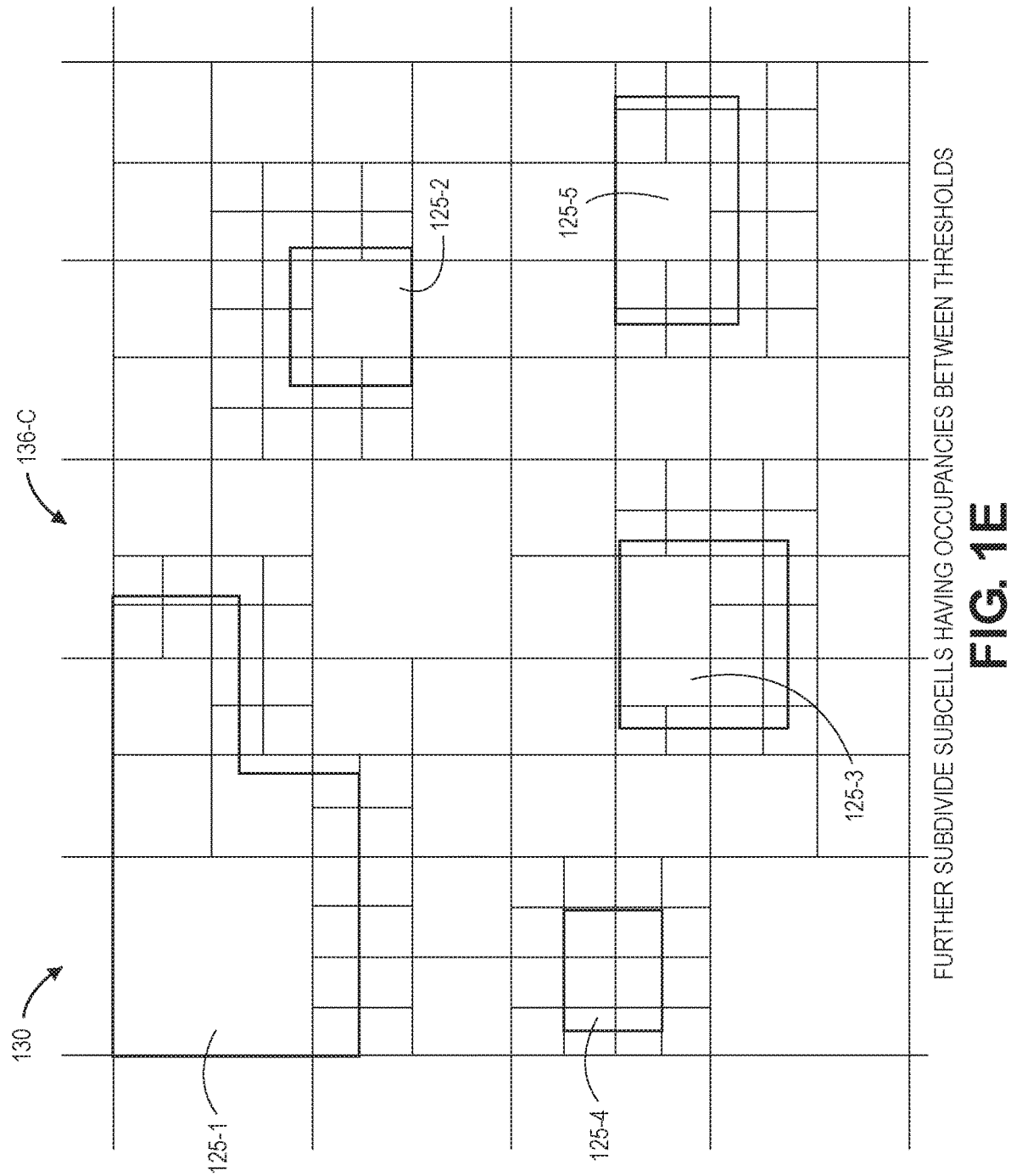

SUBDIVIDE SUBCELLS AS LONG AS OPERATIONAL CAPABILITIES MAY BE ACCOMMODATED

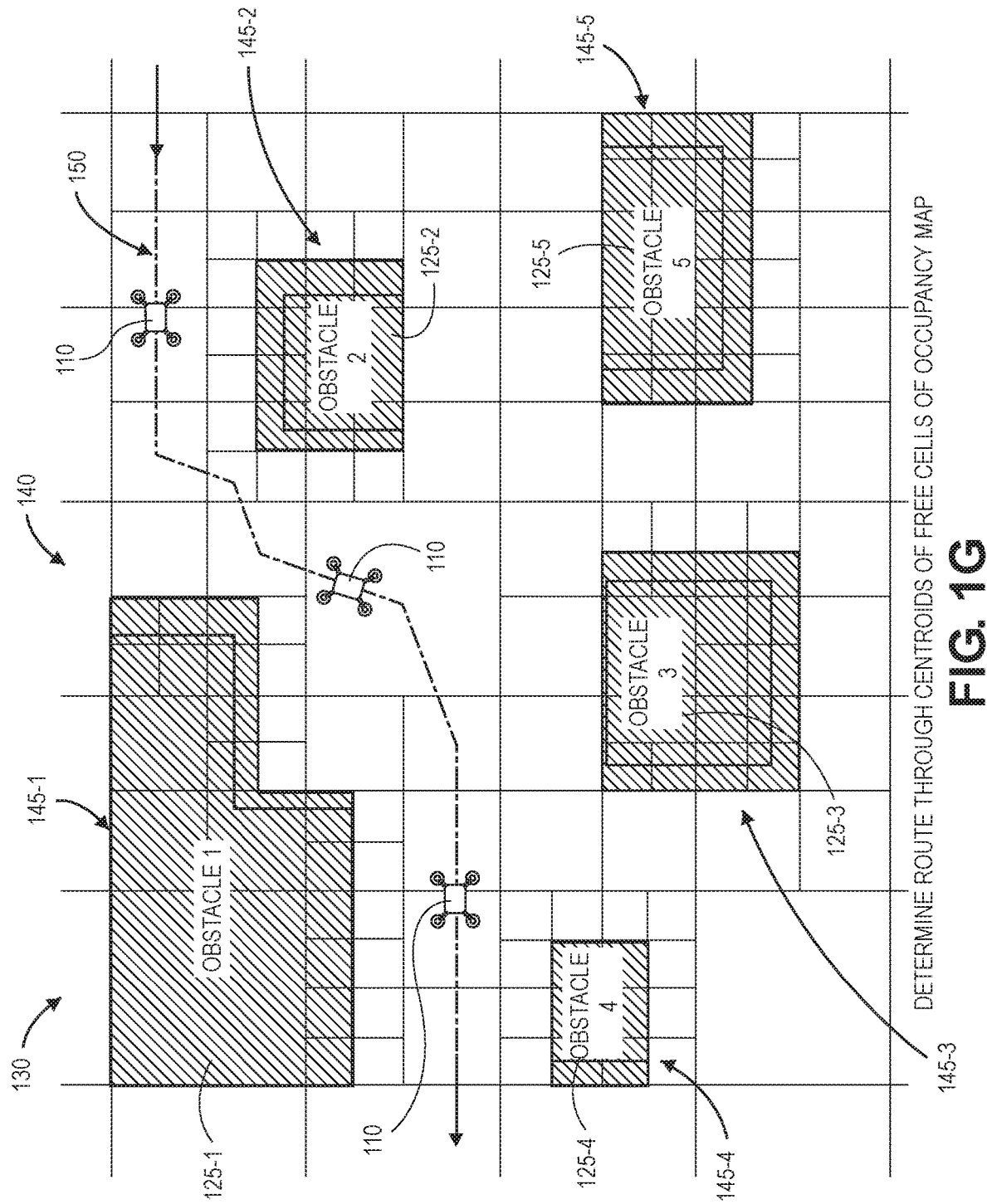
FIG. 1G DETERMINE ROUTE THROUGH CENTROIDS OF FREE CELLS OF OCCUPANCY MAP

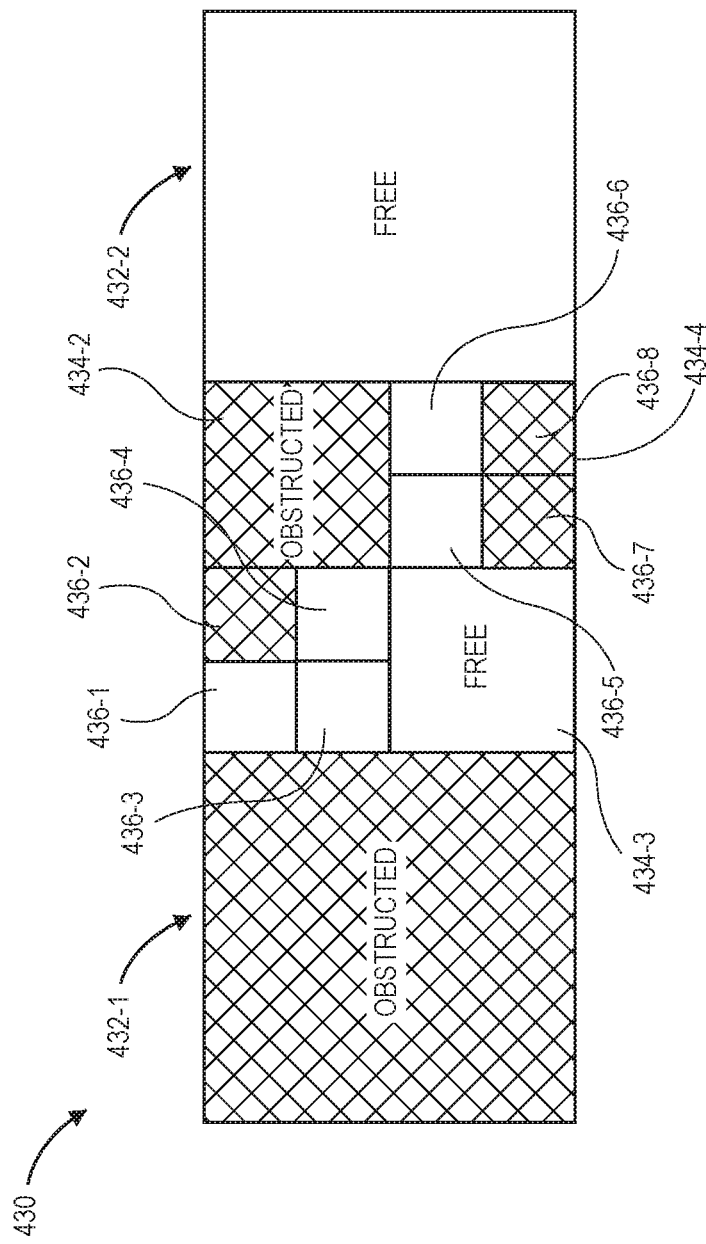

OCCUPANCY MAP DEFINED FROM LABELED CELLS AND SUBCELLS

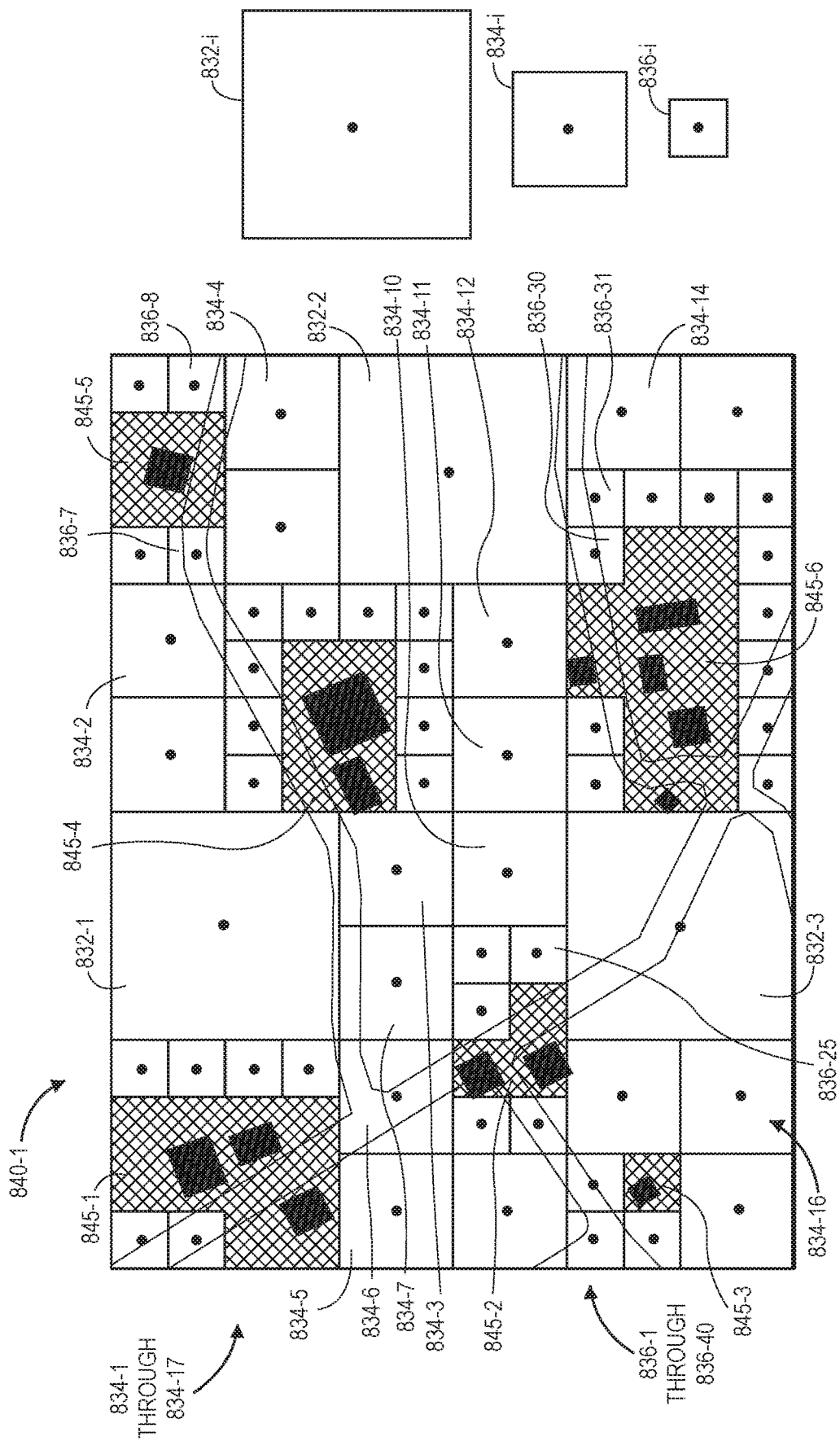

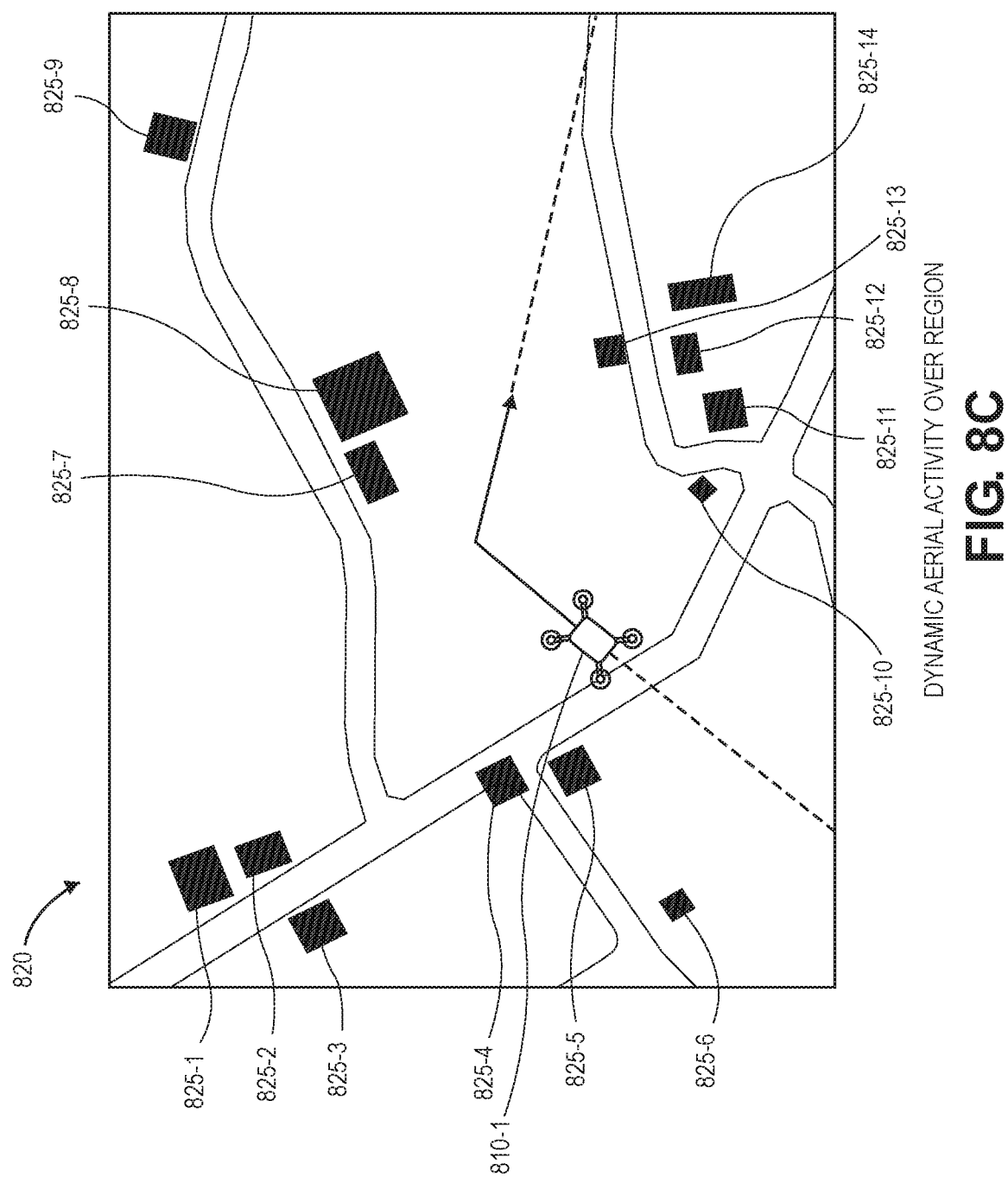

DYNAMIC ACTIVITY THROUGH REGION

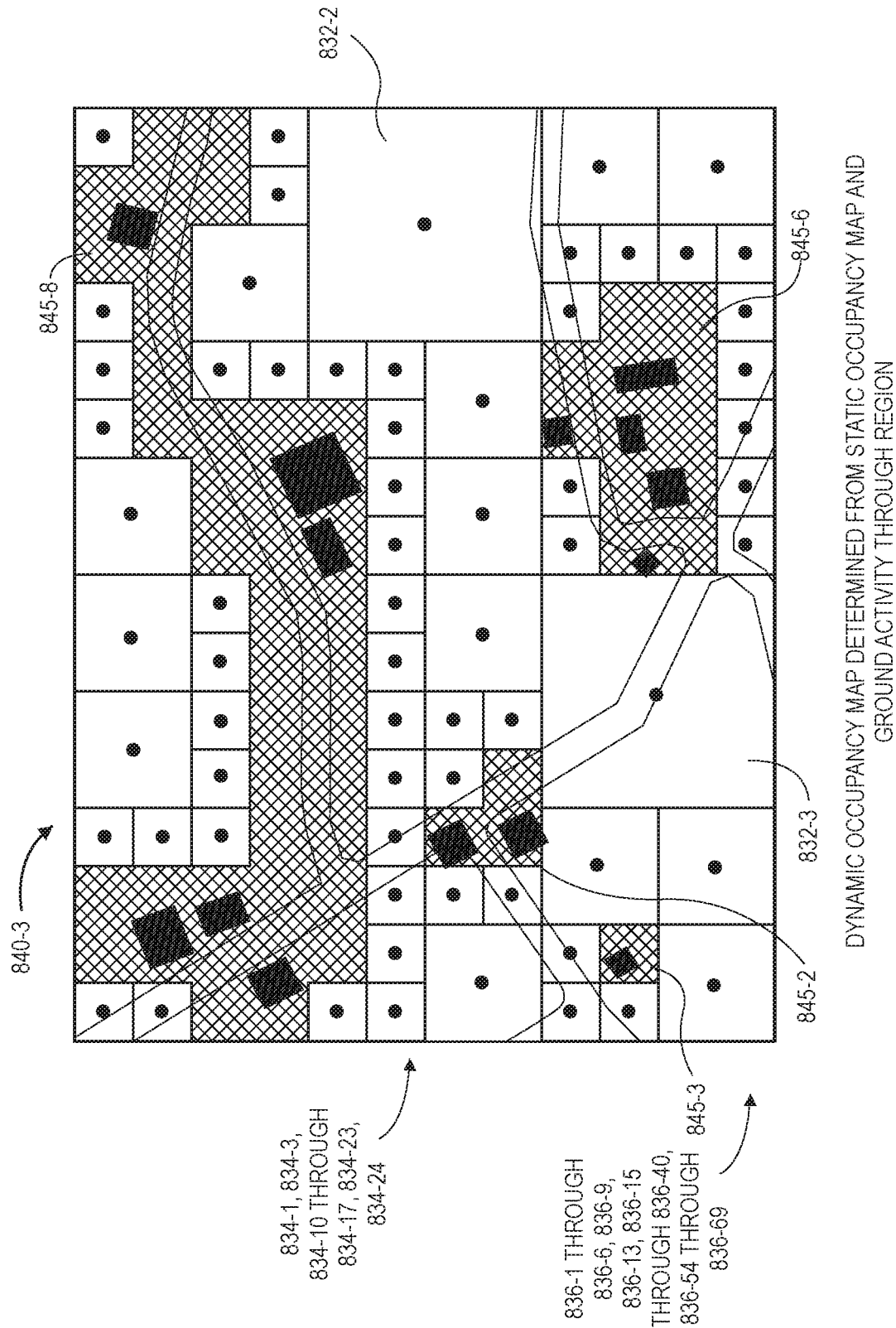

though aerial vehicles are becoming both more capable and more complex, or are shrinking in size. In particular, unmanned aerial vehicles have been used in making deliveries of items from one location to another, responding to critical issues affecting public or private safety, or completing other tasks. Unlike large aerial vehicles such as jumbo jets or propeller planes, which are typically assigned high-altitude flight paths and travel at speeds in the hundreds of miles per hour, some unmanned aerial vehicles are designed to fly at lower speeds and altitudes, or with few limitations on lateral, horizontal or vertical movements.

OPTIMAL OCCUPANCY DISTRIBUTION FOR ROUTE OR PATH PLANNING

BACKGROUND

The frequency and number of applications in which aerial vehicles, such as unmanned aerial vehicles (or "UAV") or drones, are used continue to increase over time, even as aerial vehicles are becoming both more capable and more complex, or are shrinking in size. In particular, unmanned aerial vehicles have been used in making deliveries of items from one location to another, responding to critical issues affecting public or private safety, or completing other tasks. Unlike large aerial vehicles such as jumbo jets or propeller planes, which are typically assigned high-altitude flight paths and travel at speeds in the hundreds of miles per hour, some unmanned aerial vehicles are designed to fly at lower speeds and altitudes, or with few limitations on lateral, horizontal or vertical movements.

Where unmanned aerial vehicles engage in airborne operations over or near populated areas, proper considerations must be made to maximize the reliability of a flight plan and to ensure the safety of persons or property on the ground below. In order to determine a safe route or path for an unmanned aerial vehicle, a variety of data sets are typically considered, including locations and altitudes associated with flight restrictions such as no-fly zones, routes or paths being traveled by other aerial vehicles, weather forecasts, or locations of emergency or contingency landing zones, or the like.

On some occasions, primary considerations in selecting routes or paths for aerial vehicles in general, and for unmanned aerial vehicles in particular, are the levels of occupancy or population densities of areas on grounds beneath the routes or paths. Such levels of occupancy or population densities may be used to calculate a safety score, or a reliability score, regarding a mission or a flight over such grounds. Levels of occupancy may be determined by identifying portions of ground surfaces that are occupied by buildings, structures, bodies of water, or other features, which may be determined from GIS data, digital elevation model data, digital terrain model data, orthoimages (or orthophotos), or other data sources. Population densities may be calculated based on population data obtained from a variety of sources, including local, regional, national or global datasets, which may be determined from censuses or other data sources.

BRIEF DESCRIPTION OF THE DRAWINGS

FIGS. 1A through 1G are views of aspects of one system for route or path planning in accordance with embodiments of the present disclosure.

FIGS. 4A through 4G are views of aspects of one system for route or path planning in accordance with embodiments of the present disclosure.

FIGS. 8A through 8F are views of aspects of one system for route or path planning in accordance with embodiments of the present disclosure.

DETAILED DESCRIPTION

As is set forth in greater detail below, the systems and methods of the present disclosure are directed to selecting routes or paths for vehicles, e.g., aerial vehicles or others, based on localized occupancy metrics (or occupancy levels) or other conditions existing on ground surfaces. More specifically, where occupancy data is available for a region at a selected time, such as one or more specific days, hours or minutes, or a range of days, hours or minutes, the region may be divided into a plurality of cells having a common shape and size. The occupancy data may include, but need not be limited to, data regarding building footprints, zoning designations, local infrastructure, ground surfaces, bodies of water, or other ground features within the region. Occupancy metrics may be calculated for each of the cells based on the occupation data and the common areas of such cells. Where an occupancy metric (or an occupancy level) calculated for a given cell exceeds a predetermined threshold (e.g., a high threshold), the cell may be labeled as obstructed. Where an occupancy metric calculated for a given cell falls below a predetermined threshold (e.g., a low threshold), the cell may be labeled as free from obstructions. Cells having occupancy metrics falling between the high threshold and the low threshold may be subdivided, e.g., into quadrants, and occupancy metrics may be calculated for each of the cells (e.g., subcells) formed by subdivision. Where such occupancy metrics exceed or fall below thresholds, the cells may be labeled as obstructed or free from obstructions accordingly.

Cells having occupancy metrics between such thresholds may be further subdivided, as necessary, until areas of the subdivided cells would be less than an area defined with respect to operational capabilities of the vehicle, e.g., velocities or accelerations along or about one or more axes, or any other capabilities. Once each cell has been labeled as obstructed or free, or may not be further subdivided, an occupancy map may be defined by aggregating cells that are adjacent to or contiguous with one another and have been appropriately labeled as obstructed into sectors. An occupancy map defined according to embodiments of the present disclosure may be utilized for any purpose, including but not limited to determining one or more routes or paths for vehicles within or through the region, which may be identified as passing through centroids of the cells that have been appropriately labeled as free, e.g., according to one or more search algorithms, such as an A* search algorithm. Occupancy maps may be static in nature, and defined based on occupancy data such as building footprints, zoning or surface features, or dynamic in nature, and defined based on ground-based or airborne activity such as traffic or construction activity.

Figure 1A:
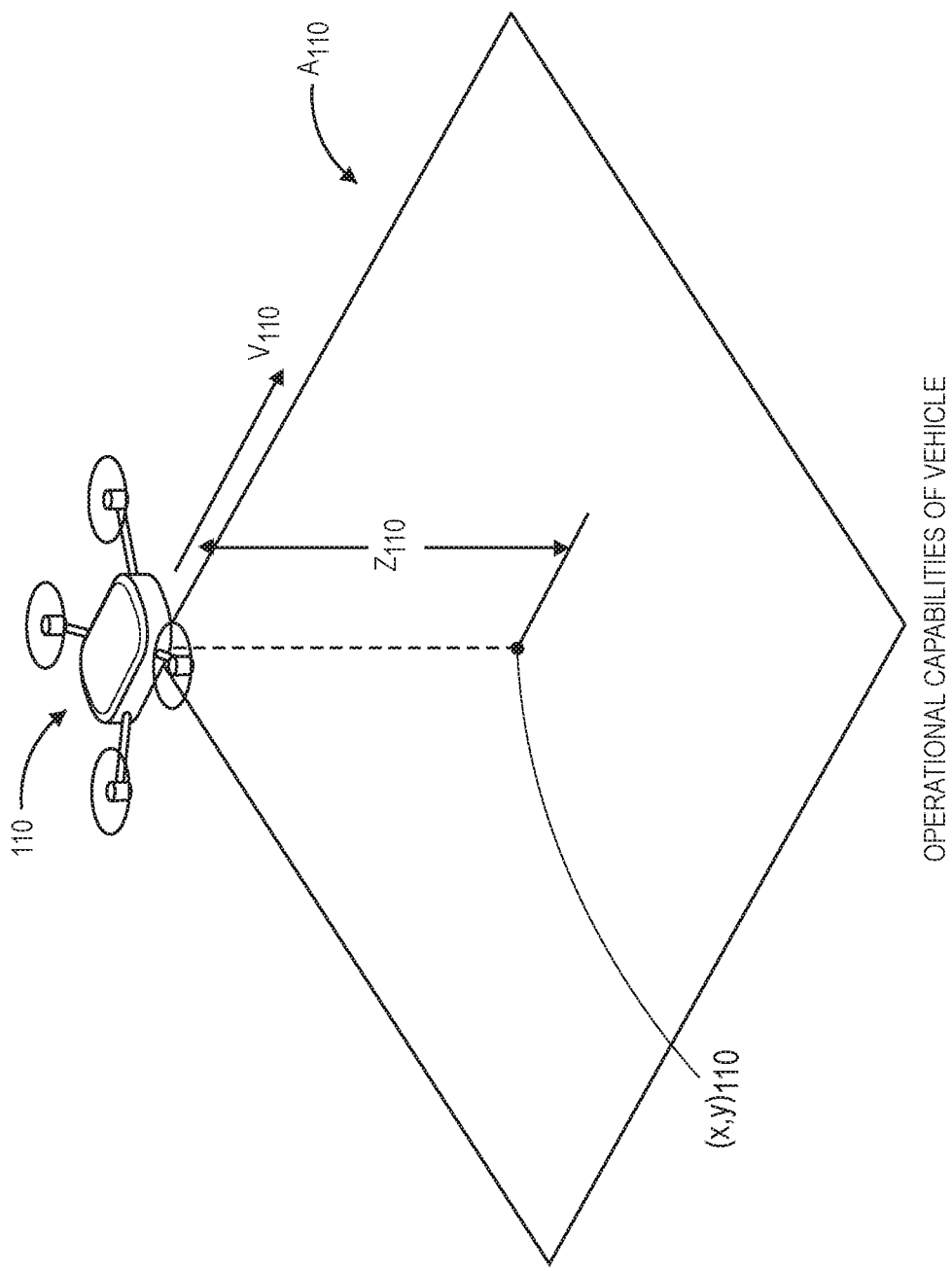

Referring to FIGS. 1A through 1G, views of aspects of one system for route or path planning in accordance with embodiments of the present disclosure are shown. As is shown in FIG. 1A, an aerial vehicle 110 is located at a position $(x, y)_{110}$, and traveling at an altitude $z_{110}$ and a velocity $V_{110}$. An area $A_{110}$ may be defined for the aerial vehicle 110 based on its operational capabilities, including not only the altitude $z_{110}$ or the velocity $V_{110}$, but also average, nominal or maximum levels or ranges of altitudes or velocities along or about one or more principal axes, or any other factors relating to the operability of the aerial vehicle 110.

Figure 1B:
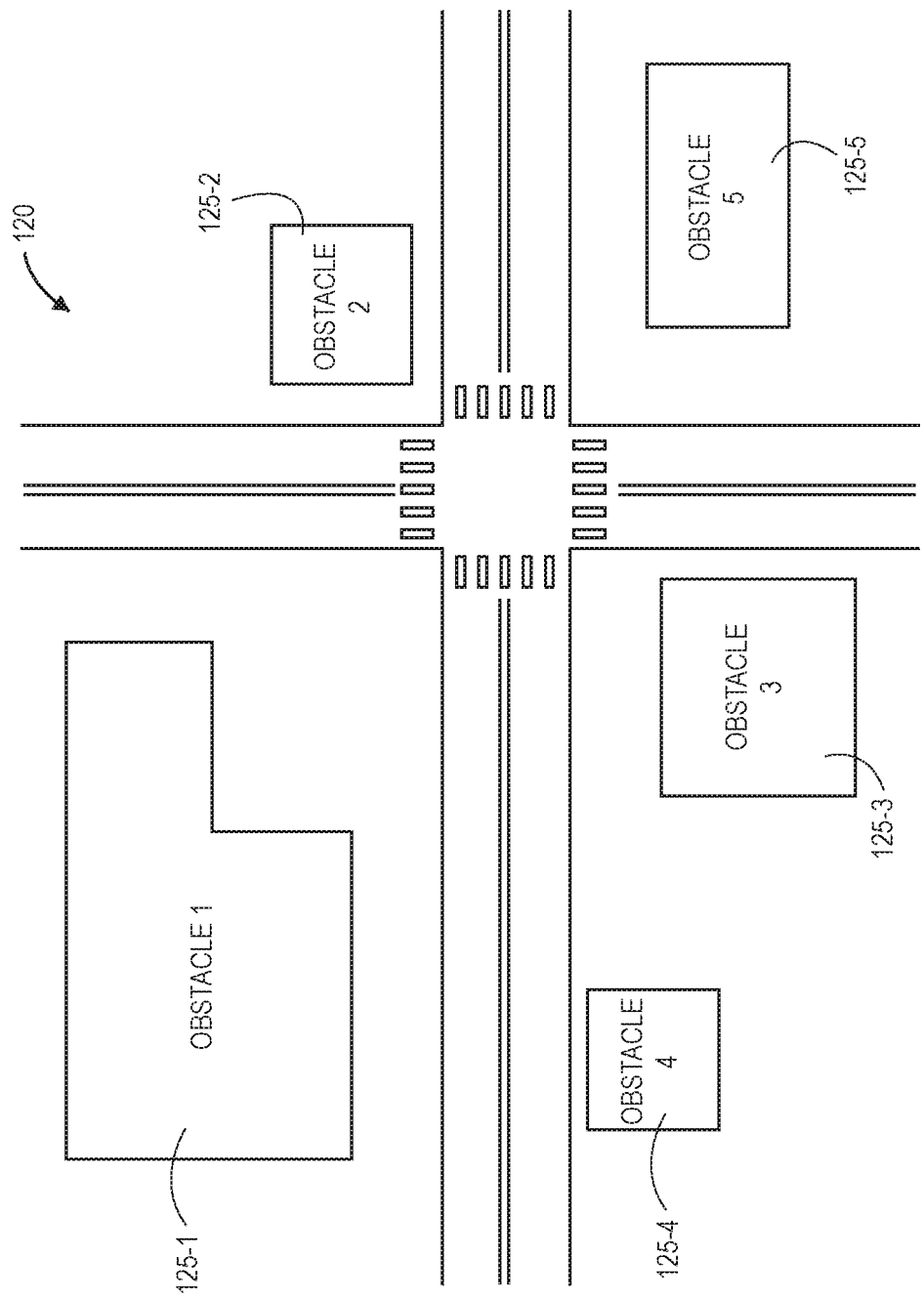

As is shown in FIG. 1B, a geographic map 120 of a region identifies locations of a plurality of obstacles 125-1, 125-2, 125-3, 125-4, 125-5, e.g., buildings or other structures. The obstacles 125-1, 125-2, 125-3, 125-4, 125-5 may be identified or selected on any basis, such as buildings having maximum areas (e.g., footprints) or heights greater than a predetermined threshold, or on any basis other than area or height. Alternatively, the geographic map 120 may further identify locations of trees, hills, cliffs, mountains, waterfalls, valleys, or other features over or through which travel by vehicles, such as the aerial vehicle 110, may be limited, difficult or impossible. The information shown on the geographic map 120 need not be limited to locations or sizes of buildings or structures. For example, the geographic map 120 may identify portions of the region having homes, e.g., single-family or multi-family dwellings, as well as portions of the region having bodies of water, e.g., ponds, lakes, reservoirs, rivers, streams, bays, portions of oceans, or other bodies, or portions of the region that include parks or other recreational areas, farmland, malls or other commercial centers, schools or other educational facilities. Additionally, as is also shown in FIG. 1B, the geographic map 120 identifies locations and areas of transportation infrastructure, such as roads, streets, or other systems for accommodating vehicle traffic, or crosswalks, sidewalks or other systems for accommodating foot traffic.

As is shown in FIG. 1C, the geographic map 120 may be divided into a grid 130 of a plurality of cells 132-a, each in the form of squares or other shapes having a common size. The grid 130 may be defined based on geographic information system (or "GIS") data, digital elevation model data, digital terrain model data, orthoimages (or orthophotos), or on any other public or private information or data, and may be divided into any number of cells 132-a, which may have any dimension, e.g., one kilometer by one kilometer (1 km×1 km), two hundred fifty meters by two hundred fifty meters (250 m×250 m), one hundred meters by one hundred meters (100 m×100 m), fifty meters by fifty meters (50 m×50 m), ten meters by ten meters (10 m×10 m), or any other area or size. The borders or boundaries of the grid 130 and the cells 132-a within the grid 130 may be stored in association with the region or the geographic map 120, e.g., as one or more layers of the geographic map 120, or determined based on data obtained from any other source. Additionally, the grid 130 need not be limited to a five-by-four grid, such as is shown in FIG. 1C.

In some embodiments, the grid 130 may be defined or applied to the geographic map 120 by aligning at least one side or edge of the grid 130 along at least one side or edge of one of the obstacles 125-1, 125-2, 125-3, 125-4, 125-5, e.g., a wall or other surface of a building, a parcel of land, a road or street, or another ground feature. For example, as is shown in FIG. 1C, the grid 130 may be defined or applied to the geographic map 120 by placing at least one corner or vertex of the grid 130 at or near at least one corner or vertex of the obstacle 125-1 within the geographic map 120, or along at least one side or edge of the obstacle 125-1. In some embodiments, at least one of the lines of the grid 130 may be aligned along or may correspond to a line of latitude or a line of longitude on the geographic map 120. Alternatively, in some embodiments, the geographic map 120 may be divided by a matrix, a tessellation or some other framework or network of intersecting lines, other than the grid 130, and the cells 132-a may have shapes other than squares or rectangles (e.g., circles, triangles or other shapes).

Metrics (or ratios, or scores, or other indicators) of portions of areas of the cells 132-a that are occupied by the obstacles 125-1, 125-2, 125-3, 125-4, 125-5 may be calculated. The various cells 132-a of the grid 130 that are entirely occupied by portions of the obstacles 125-1, 125-2, 125-3, 125-4, 125-5, or are nearly entirely occupied by portions of the obstacles 125-1, 125-2, 125-3, 125-4, 125-5, may be deemed obstructed. Likewise, the various cells 132-a of the grid 130 that are not occupied by any portion of one of the obstacles 125-1, 125-2, 125-3, 125-4, 125-5, or are nearly entirely unoccupied by portions of the obstacles 125-1, 125-2, 125-3, 125-4, 125-5, may be deemed unobstructed. For example, where a metric (or a ratio, a score or other indicator) calculated for a portion of one of the cells 132-a including the obstacles 125-1, 125-2, 125-3, 125-4, 125-5 exceeds a first predetermined threshold, e.g., a high threshold, the one of the cells may be labeled as "obstructed," or another label signifying that the cells are impassible or should not be included within any path or route of a vehicle, while the metric (the ratio, the score or the other indicator) calculated for the portion of the one of the cells 132-a including the obstacles 125-1, 125-2, 125-3, 125-4, 125-5 falls below a second predetermined threshold, e.g., a low threshold, the one of the cells may be labeled as "free," or unobstructed.

As is shown in FIG. 1D, the cells 132-a having metrics between the first and second thresholds, or the cells 132-a that may not be labeled obstructed or free based on such metrics, are subdivided into a plurality of cells (e.g., subcells) 134-b. For example, the cells 132-a that include portions of one or more of the obstacles 125-1, 125-2, 125-3, 125-4, 125-5 may be quartered, or divided into quadrants, of cells 134-b having the same shapes as the cells 132-a (viz., squares or other rectangles) and one-quarter the areas of the cells 132-a. Alternatively, the cells 134-b may have shapes other than squares or rectangles, and areas greater than or less than one-quarter of the area of the cells 132-a.

Similarly, metrics of portions of areas of the cells 134-b that are occupied by the obstacles 125-1, 125-2, 125-3, 125-4, 125-5 may be calculated, and the various cells 134-b that have metrics above the first predetermined threshold (e.g., the high threshold) may be labeled as obstructed, while the various cells 134-b that have metrics below the second predetermined threshold (e.g., the low threshold) may be labeled as "free," or unobstructed.

As is shown in FIG. 1E, the cells 134-b having metrics between the first and second thresholds, or the cells 134-b that may not be labeled "obstructed" or "free" based on such metrics, are subdivided into a plurality of cells (e.g., subcells) 136-c. For example, the cells 134-b that include portions of one or more of the obstacles 125-1, 125-2, 125-3, 125-4, 125-5 may be quartered, or divided into quadrants, of cells 136-c having the same shapes as the cells 134-b (viz., squares or other rectangles) and one-quarter of the area of the cells 134-b. Alternatively, the cells 136-c may have shapes other than squares or rectangles, and areas greater than or less than one-quarter of the area of the cells 134-b.

Figure 1F:
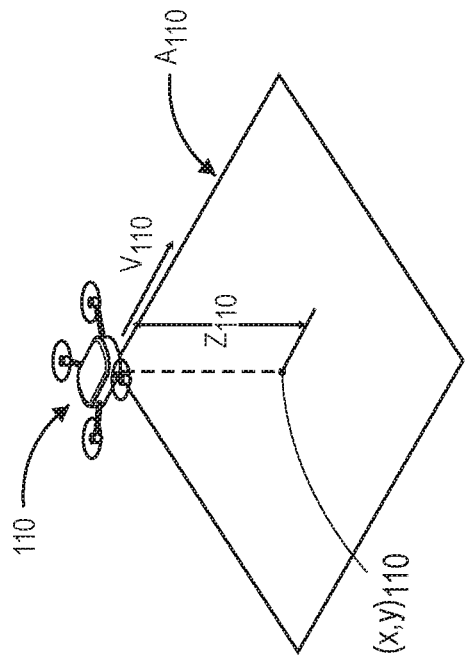
Figure 1F:
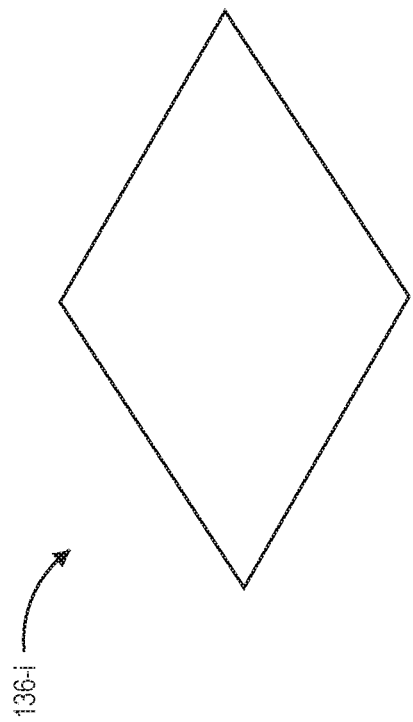

As is shown in FIG. 1F, cells may be divided or subdivided for any number of iterations, until an area of a cell formed by division or subdivision would be less than the area $A_{110}$ defined for the aerial vehicle 110 based on its operational capabilities, as shown in FIG. 1A. For example, as is shown in FIG. 1F, the cells 134-b having metrics between the first predetermined threshold and the second predetermined threshold (e.g., between the high threshold and the low threshold) may be divided into the cells 136-c if an area of one of the cells 136-i is greater than the area $A_{110}$ defined for the aerial vehicle 110 based on its operational capabilities. In some embodiments, where one-quarter of the area of each of the cells 134-b is greater than the area $A_{110}$, the cells 134-b having metrics between the first predetermined threshold and the second predetermined threshold (e.g., between the high threshold and the low threshold) may be divided into the cells 136-c by quartering each of such cells 134-b accordingly.

Once the cells 132-a, 134-b, 136-c of the grid 130 have been divided or subdivided to a minimum size that may accommodate the area $A_{110}$ defined for the aerial vehicle 110 based on its operational capabilities, the cells 136-c having metrics above the second predetermined threshold (e.g., the low threshold) may be labeled as obstructed, and the cells 136-c need not be further divided or subdivided. An occupancy map may be derived for the region by aggregating the cells 132-a, 134-b, 136-c that have been labeled "obstructed," and are adjacent to or contiguous with one another. For example, as is shown in FIG. 1G, an occupancy map 140 includes sectors 145-1, 145-2, 145-3, 145-4, 145-5 formed from collections of the cells 132-a, 134-b, 136-c of the grid 130 that have been labeled as obstructed, e.g., based on the occupancy metrics calculated from the underlying presence of the obstructions 125-1, 125-2, 125-3, 125-4, 125-5 within such cells.

The occupancy map 140 may be utilized to select a route 150 comprising a plurality of paths for travel by the aerial vehicle 110. The occupancy map 140 may be used to determine one or more safe routes or paths for the aerial vehicle 110 when traveling through the region shown in the geographic map 120, e.g., when performing a mission. For example, as is also shown in FIG. 1G, each of the paths of the route passes through centroids of one or more of the cells 132-a, 134-b, 136-c of the grid 130 that have been labeled as free, e.g., based on the absence of any obstructions within such cells.

In some embodiments, the route 150 or the paths determined for the aerial vehicle 110 may have either an origin or a destination within the region shown in the geographic map 120, or may require the vehicle to travel over or near one or more portions of the region shown in the geographic map 120. Routes or paths that are determined based on the occupancy map 140 may be selected in order to meet any standards or requirements of safety or reliability for travel through the region or for a given mission, which may change from time to time, such as by reducing or minimizing ground-level occupancies over or through which the vehicle will travel while performing the mission. For example, where an origin or a destination within the region depicted in the geographic map 120 are known, a route or a path through the region may be determined based on the occupancy map 140 according to any number of algorithms or techniques, e.g., according to a search algorithm, or a cost minimization algorithm, that considers costs of traveling between various points within the occupancy map 140. In some embodiments, the search algorithm may be an A* search algorithm that calculates a unitless measure of cost associated with traveling from an origin in one of the cells 132-a, 134-b, 136-c, through centroids of any of the cells, to any of the other cells 132-a, 134-b, 136-c, or anywhere else outside of the occupancy map 140.

Alternatively, in some embodiments, the occupancy map 140 may be defined or modified based on dynamic activity occurring within the portion of the region represented in the geographic map 120, including ground-based or airborne activity. For example, in some embodiments, to the extent that dynamic ground activity (e.g., construction or vehicle traffic) or aerial activity within the region represented in the geographic map 120 is known, occupancy metrics may be calculated based not only on the presence or absence of portions of the obstacles 125-1, 125-2, 125-3, 125-4, 125-5 within cells or subcells, e.g., static occupancy data, but also the extent of ground activity or aerial activity within or over cells or subcells, e.g., dynamic activity data (or dynamic occupancy data). An occupancy map may be defined based on both the occupancy metrics and the activity data. In some other embodiments, a static occupancy map defined based on occupancy metrics calculated from the presence or absence of portions of the obstacles 125-1, 125-2, 125-3, 125-4, 125-5 within cells or subcells, e.g., static occupancy data, dynamic activity data (or dynamic occupancy data) may be considered. To the extent that ground activity or aerial activity within cells or subcells that have been appropriately labeled as free within the static occupancy map would change the values of the occupancy metrics calculated for such cells or subcells, a dynamic occupancy map reflecting cells or subcells having labels of free, and sectors of aggregated cells or subcells having labels of obstructed, may be defined based on the changes in such occupancy metrics.

Accordingly, the systems and methods of the present disclosure are directed to determining routes or paths for vehicles over or through a region based on occupancy maps derived for the region by dividing the region into a plurality of cells, calculating occupancy metrics for the cells, and labeling such cells as obstructed or free based on the occupancy metrics. Where a cell may not be labeled as obstructed or free based on occupancy metrics, the cell may be further divided or subdivided, and occupancy metrics may be calculated for the cells that are defined by the division or subdivision. The cells may be further divided or subdivided, as necessary, until such cells may be labeled as obstructed or free based on their respective occupancy metrics, or until cells formed from further subdivision would have areas smaller than an area defined for a given vehicle based on its operational capabilities. Cells labeled as obstructed may be aggregated accordingly, and an occupancy map may be derived from the aggregated obstructed cells that are adjacent to or contiguous with one another, and the various cells that have been labeled as free. Routes or paths for a given vehicle through centroids of the cells that have been labeled as free may be determined, e.g., according to a search algorithm, or a cost minimization algorithm, such as an A* search algorithm.

Many algorithms for determining or planning routes or paths for vehicles, such as unmanned aerial vehicles, decompose high-level specifications of a mission into low-level descriptions of motion through three-dimensional space. Typically, searching for and planning routes or paths for vehicles are performed according to one of two computational or spatial approaches, viz., a grid-based approach and an interval-based approach. In a grid-based approach, a grid having a plurality of fixed-size cells is naively overlaid on an entire operational space, inclusive of obstacles or other non-navigational areas, as well as free regions, without any consideration of the sizes or shapes of elements or other obstacles on the ground. The grid is then considered by a search algorithm, such as an A* algorithm, to search for steps of such paths, in order to ensure that grid cells having obstacles or substantial risks of collision are not located within such paths. In an interval-based approach, an entire occupational space is first broken down into free regions (e.g., unobstructed regions) and non-feasible regions (e.g., potentially obstructed regions). A path search algorithm then searches for a feasible path within the free regions of the occupational space, but also does not consider sizes or shapes of elements or other obstacles on the ground.

The grid-based approach and the interval-based approach may occasionally suffer from a number of inefficiencies, however. First, both approaches are computationally unwieldy where an operational space includes a large number of obstacles, e.g., within wooded areas, a high density of obstacles, e.g., within cities or other urban areas or obstacles that are large or irregularly shaped, such as industrial areas or sports arenas. In such operational spaces, a search space, e.g., an entire grid, or a tessellation of free or feasible regions, may be subjected to too many constraints in order to be adequately considered in searching for an optimal route or path.

The systems and methods of the present disclosure are directed to optimizing the distribution of occupancy on ground surfaces in planning routes or paths for vehicles. In accordance with embodiments of the present disclosure, an operational space is tessellated in a manner that is both dynamic and granular, to the extent that the ground surfaces within the operational space demand such granularity. In particular, the operational space may be divided and subdivided into cells at varying levels of granularity that are consistent with the granularity of the free regions within the operational space, thereby maximizing the sizes of cells that are "free," or substantially clear of risks, e.g., with occupancy metrics below a predetermined threshold.

In some embodiments, a region or a geographic map or other representation of the region may be divided into a grid having a plurality of cells. Occupancy data determined for the region (e.g., building footprints or other data) may be allocated to each of such cells, and occupancy metrics may be calculated for the respective cells based on the occupancy data. Where a cell may be deemed obstructed or free based on sufficiently high or low occupancy metrics respectively, the cell is so labeled. Where a cell may not be deemed obstructed or free based on its occupancy metric, however, the cell is subdivided into a plurality of cells (e.g., subcells), and occupancy metrics may be calculated for each of such cells. To the extent that the cells may not be deemed obstructed or free based on their respective occupancy metrics, the cells may be divided or subdivided until further division or subdivision would result in the formation of cells having areas smaller than an area defined with respect to one or more operational capabilities of a vehicle (e.g., where the area defined for the vehicle is greater than one-quarter of the areas of the given cells, if the cells are to be quartered). For example, in some embodiments, cells may be divided into four cells (e.g., subcells), in a manner similar to a quad tree data structure, and each of the four cells or subcells may be labeled as obstructed or free, or further subdivided and analyzed accordingly. Alternatively, a cell may be divided into any number of other cells having any other shape or size. An occupancy map may be defined by aggregating the cells or subcells that are labeled as obstructed, and used to select a route or a path for a vehicle through the various cells or subcells that are labeled as free.

Alternatively, in some embodiments, a quad tree data structure, e.g., a conjugate quad tree, may be formed from cells that have been labeled as obstructed, rather than from cells that have been labeled as free. In such embodiments, an occupancy map may be defined by aggregating cells or subcells that are labeled as free, and utilized not for route or path planning, but for contact or collision avoidance, or other like purposes, e.g., by avoiding specific cells or subcells that have been labeled as obstructed.

In some embodiments, a region or a geographic map or other representation may be divided into a grid having a plurality of cells by placing a line or a vertex of the grid or one or more of the cells along or on an edge or corner of one or more buildings or structures within the region. The grid and occupancy data identified for the region may be used to derive an occupancy map for the region, according to one or more of the embodiments disclosed herein.

In some embodiments, occupancy maps may be generated for a plurality of vehicles by dividing or subdividing a region or a geographic map or other representation of the region into a plurality of cells, and dividing or subdividing the cells until further division or subdivision of such cells would result in the formation of cells having areas smaller than an area defined with respect to operational capabilities of each of the vehicles. The occupancy maps so generated may be used to select one or more vehicles for traveling through the region, e.g., in the performance of one or more missions.

A level of occupancy of a region, or of one or more cells into which the region or a map or other representation of the region is divided, e.g., an "occupancy metric" or "occupancy level," may be determined in any manner, and on any basis. In some embodiments, occupancy metrics for a region or for such cells may be calculated based on data regarding building footprints, zoning designations, local infrastructure, ground surfaces, bodies of water, or other features, which may be determined from GIS data, digital elevation model data, digital terrain model data, orthoimages (or orthophotos), or other sources. In some embodiments, occupancy metrics may be calculated based on population data for the region or for such cells obtained from a public or private source, such as one or more sets of data, e.g., LandScan data maintained by the United States Department of Energy's Oak Ridge National Laboratory, WorldPop data maintained by the University of Southampton, or any other sets of data.

Additionally, one or more of the systems or methods disclosed herein may be performed by one or more servers or back-end machines, in a "cloud"-based environment, or by one or more processors or control systems provided aboard a vehicle, e.g., an aerial vehicle, in real time or in near-real time. Moreover, in some embodiments, a vehicle may define an occupancy map, or an occupancy map may be defined for the vehicle, based on static occupancy data such as building footprints or the like, and a route or a path may be selected for the performance of a mission. During the mission, the vehicle may update the occupancy map, or the occupancy map may be updated for the vehicle, based on dynamic activity on the ground or in the air within a region through or near which the vehicle is to pass during the performance of the mission. The vehicle may then revise the route or the path based on the updated occupancy map, or the route or the path may be revised for the vehicle based on the updated occupancy map.

Figure 2:
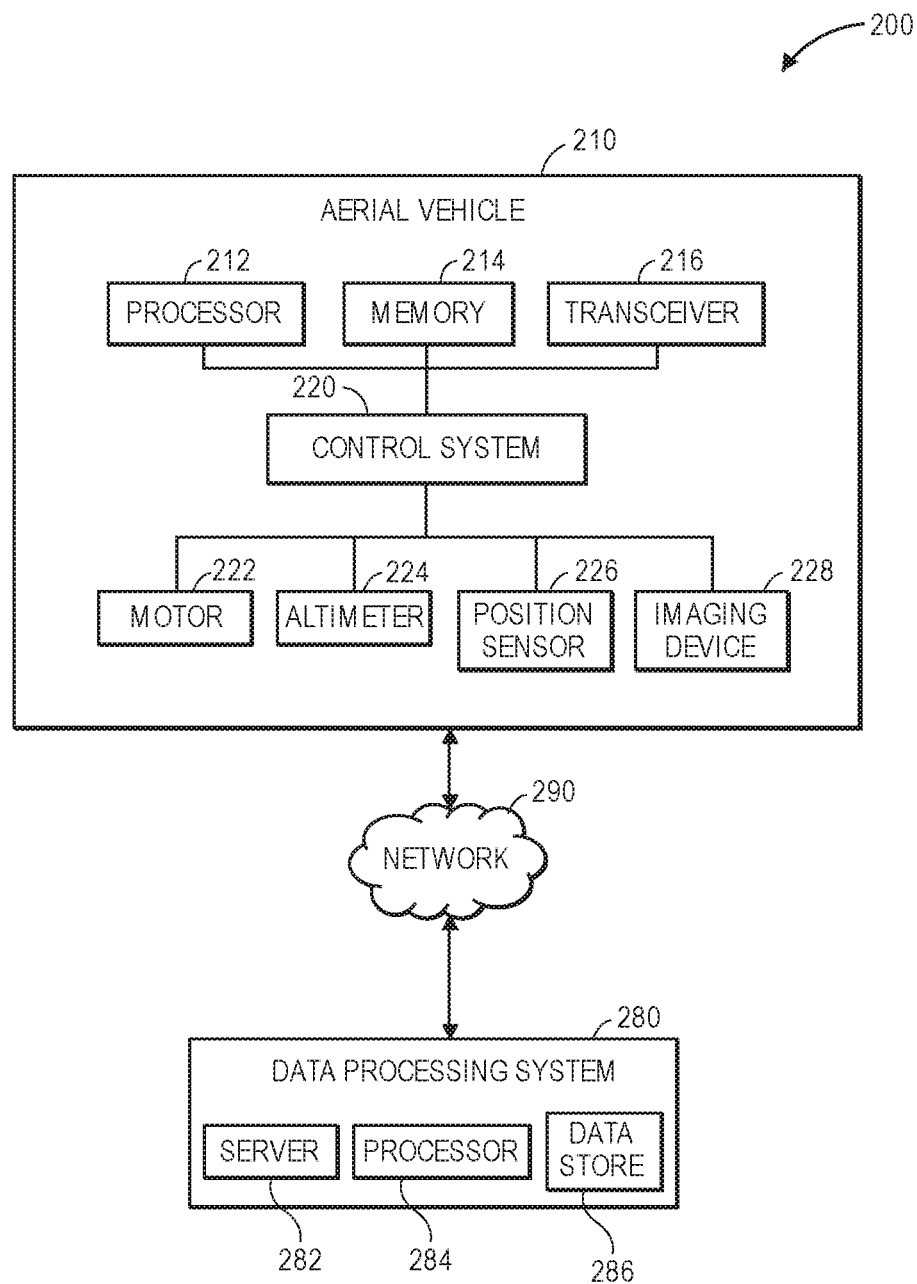
FIG. 2 is a block diagram of one system for route or path planning in accordance with embodiments of the present disclosure.

Referring to FIG. 2, a block diagram of one system 200 for route or path planning in accordance with embodiments of the present disclosure is shown. The system 200 of FIG. 2 includes an aerial vehicle 210 and a data processing system 280 connected to one another over a network 290, which may include the Internet in whole or in part. Except where otherwise noted, reference numerals preceded by the number "2" shown in FIG. 2 indicate components or features that are similar to components or features having reference numerals preceded by the number "1" shown in FIGS. 1A through 1G.

As is shown in FIG. 2, the aerial vehicle 210 includes a processor 212, a memory 214 and a transceiver 216. The aerial vehicle 210 further includes a control system 220, a plurality of propulsion motors 222, an altimeter 224, a position sensor 226 and an imaging device 228.

The processor 212 may be configured to perform any type or form of computing function associated with the operation of the aerial vehicle 210, including but not limited to the execution of one or more machine learning algorithms or techniques. The processor 212 may also be configured to execute any other algorithms or techniques (e.g., object detection or recognition algorithms or techniques) associated with one or more applications, purposes or functions, e.g., to select at least one of a course, a speed, an altitude or an orientation (e.g., one or more of a yaw angle, a pitch angle or a roll angle) for the safe operation of the aerial vehicle 210.

For example, the processor 212 may be configured to control any aspects of the operation of the aerial vehicle 210 and the one or more computer-based components thereon, including but not limited to the propulsion motors 222, the altimeter 224, the position sensor 226 and/or the imaging device 228. The processor 212 may control the operation of one or more control systems or modules, such as the control system 220, for generating instructions for conducting operations of one or more of the propulsion motors 222, the altimeter 224, the position sensor 226 and/or the imaging device 228, or for interpreting information or data captured using one or more other sensors. Such control systems or modules may be associated with one or more other computing devices or machines, and may communicate with the data processing system 280 or one or more other computer devices or aerial vehicles (not shown) over the network 290, by the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., map data, or instructions for operating the aerial vehicle 210, or information or data captured during operations of the aerial vehicle 210. For example, the memory 214 may be configured to store any relevant information regarding the operation of the aerial vehicle 210 including but not limited to occupancy data such as building footprints (e.g., square footage and locations of features of such buildings), zoning designations, ground surfaces, bodies of water, or other features that may be determined from GIS data, digital elevation model data, digital terrain model data, orthoimages (or orthophotos), or others, as well as courses, speeds, altitudes or orientations of the aerial vehicle 210 at one or more locations, or one or more operating characteristics (e.g., numbers of propulsion motors 222 that are operating and at which speeds, numbers of control surfaces that are operated and at which angles or distances), environmental conditions (e.g., weather projections, ground conditions, cloud coverage, sunshine or other information or data), imaging data or any other information or data regarding such locations. The memory 214 may be configured to store executable instructions, imaging data, flight routes or paths, or flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight routes or paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or I/O devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the propulsion motors 222, the altimeter 224, the position sensor 226 and/or the imaging device 228. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect ("PCI") bus standard or the USB standard. In some other embodiments, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the propulsion motors 222, the altimeter 224, the position sensor 226 and/or the imaging device 228, such as to cause one or more of the propulsion motors 222 to rotate propellers at desired speeds, to capture information or data regarding altitudes, positions and/or speeds, and to cause one or more of the imaging devices 228 to capture any imaging data (e.g., still or moving images) as well as any associated audio data and/or metadata. The control system 220 may also operate the one or more propulsion motors 222 to cause such propellers to be aligned in selected positions or angles. The control system 220 may further control any other aspects of the aerial vehicle 210, including but not limited to the operation of one or more control surfaces (not shown) such as wings, rudders, ailerons, elevators, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216.

The propulsion motors 222 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, or to aerially transport any payload engaged thereby. In some embodiments, one or more of the propulsion motors 222 may be a brushless direct current ("DC") multi-phase motor such as an outrunner brushless motor or an inrunner brushless motor.

The aerial vehicle 210 may include any number of such propulsion motors 222 of any kind. For example, one or more of the propulsion motors 222 may be aligned or configured to provide forces of lift to the aerial vehicle 210, exclusively, while one or more of the propulsion motors 222 may be aligned or configured to provide forces of thrust to the aerial vehicle 210, exclusively. Alternatively, one or more of the propulsion motors 222 may be aligned or configured to provide forces of lift and forces of thrust to the aerial vehicle 210, as needed. For example, the propulsion motors 222 may be fixed in their orientation on the aerial vehicle 210, or configured to vary their respective orientations, e.g., a tilt-rotor aircraft. Moreover, the propulsion motors 222 may be aligned or configured to operate with different capacities or ratings, or at different speeds, or coupled to propellers having different sizes and shapes. Additionally, one or more of the propulsion motors 222 may be an electric motor, e.g., a brushless DC multi-phase motor, and one or more of the propulsion motors 222 may be a gasoline-powered motor.

Each of the propulsion motors 222 may be coupled to one or more propellers (or rotors or rotatable systems) having a plurality of shaped blades joined to a hub or boss. For example, each of such propellers may be rotatably mounted to a mast or shaft associated with a respective one of the propulsion motors 222 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The position sensor 226 may be any device, component, system or instrument adapted to receive signals (e.g., trilateration data or information) relating to a position of the aerial vehicle 210. For example, the position sensor 226 may be adapted to receive signals from one or more satellites of a positioning network, such as Global Positioning System (or "GPS") satellites, GLONASS satellites, Galileo satellites, or satellites of any other global navigation satellite system. The position sensor 226 may also be adapted to receive signals from one or more towers or beacons from a cellular telephone network, or from any other source (not shown). In some embodiments, the position sensor 226, or position data received thereby, may be used to determine an airspeed of the aerial vehicle 210 over time. In some other embodiments, the aerial vehicle 210 may include one or more devices, components, systems, or instruments for determining a speed or velocity of the aerial vehicle 210, and may include related components (not shown) such as pitot tubes, accelerometers, or other features. For example, alternatively, or additionally, the aerial vehicle 210 may include one or more other devices, components, systems or instruments for determining information or data regarding the operation of the aerial vehicle, including but not limited to one or more airspeed sensors (e.g., any type or form of anemometer or other system for determining a speed of air flow within a vicinity of the aerial vehicle 210), which may include one or more pitot tubes, ultrasonic transceivers (e.g., transmitters and/or receivers) or other devices, components, systems or instruments, which may operate independently or in conjunction with one another. The aerial vehicle 210 may also include one or more other devices, components, systems or instruments for determining an altitude of the aerial vehicle 210, e.g., an altimeter or other device, component, system, or instrument having any number of barometers, transmitters, receivers, range finders (e.g., laser or radar), imaging devices or other features for determining altitudes above ground. For example, in some embodiments, the aerial vehicle 210 may include an inertial measurement unit having one or more accelerometers, gyroscopes or magnetometers (e.g., compasses), and the position sensor 226 may be a component part of the inertial measurement unit, or a separate component.

The imaging device 228 may be any form of optical recording devices that may be aligned with respect to any expected or ordinary operating orientation of the aerial vehicle 210, and configured to photograph or otherwise record imaging data of objects or any other elements within fields of view forward of, aft of, lateral to, above or below the aerial vehicle 210, or for any other purpose. The imaging device 228 may include one or more processors, one or more memory or storage components, and one or more image sensors, e.g., color sensors, grayscale sensors, black-and-white sensors, depth sensors, or the like, and may further include one or more photosensitive surfaces, filters, chips, electrodes, clocks, boards, timers, power sources, connectors or any other relevant features (not shown). The imaging device 228 may capture imaging data in the form of one or more still or moving images of any kind or form, as well as any relevant audio signals or other information during the operation of the aerial vehicle 210.

The imaging device 228 may be mounted, fixed, embedded or otherwise joined to one or more external surfaces of the aerial vehicle 210 in any manner and in any orientation or alignment to capture imaging data from above the aerial vehicle 210. For example, the imaging device 228 may be coupled to any form of support system or structure for maintaining the lenses or other optical elements of the imaging device 228 at a selected orientation or configuration. Alternatively, the imaging device 228 may be mounted, fixed, embedded or otherwise joined to external surfaces of the aerial vehicle 210 in any other manner.

The imaging device 228 may communicate with the processor 212 and/or the control system 220, or with one another, by way of a wired or wireless connection that may be dedicated or comprise all or part of an internal network (not shown), e.g., an internal communications bus. Additionally, the imaging device 228 may be adapted or otherwise configured to communicate with the data processing system 280 by way of the network 290. The imaging device 228 may be of any type or form in accordance with the present disclosure, including but not limited to one or more digital cameras, depth sensors or range cameras, infrared cameras, radiographic cameras or other optical sensors.

In addition to the altimeter 224, the position sensor 226 and the imaging device 228, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more acoustic sensors or other devices, components, systems or instruments for capturing and/or interpreting acoustic energy, including but not limited to one or more microphones (e.g., a transducer such as a dynamic microphone, a condenser microphone, a ribbon microphone or a crystal microphone) that are configured to convert acoustic energy of any intensity and across any or all frequencies into one or more electrical signals. Such acoustic sensors may be mounted to or distributed throughout an airframe or other structure of the aerial vehicle 210 and may include any number of diaphragms, magnets, coils, plates, or other like features for detecting and recording such energy, piezoelectric sensors (e.g., sensors configured to convert changes in pressure to electrical signals, including one or more crystals, electrodes or other features), or vibration sensors. The aerial vehicle 210 may further include one or more compasses, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or other sensors.

Although the block diagram of FIG. 2 includes a single box for an aerial vehicle 210, a single box for a propulsion motor 222, a single box for an altimeter 224, a single box for a position sensor 226, and a single box for an imaging device 228, those of ordinary skill in the pertinent arts will recognize that the system 200 may include any number or type of aerial vehicles, propulsion motors, altimeters, position sensors, imaging devices or other sensors, or customers, in accordance with the present disclosure.

The data processing system 280 includes one or more physical computer servers 282 having one or more computer processors 284 and any number of data stores 286 (e.g., databases) associated therewith, as well as provided for any specific or general purpose. For example, the data processing system 280 of FIG. 2 may be independently provided for the exclusive purpose of receiving, analyzing or storing information or data relating to geographic maps of one or more regions, locations or boundaries of one or more of such regions, population data covering such regions, locations of infrastructure within such regions, or any other factors. Alternatively, the data processing system 280 may be provided in connection with one or more physical or virtual services that are configured to receive, analyze or store such information or data, or other information or data, as well as one or more other functions. In some embodiments, the data processing system 280 of FIG. 2 may be configured to receive, analyze or store information or data relating to operations of the aerial vehicle 210, including positions (e.g., latitudes, longitudes and/or altitudes) of the aerial vehicle 210 at various times, or imaging data captured using the imaging device 228.

In some embodiments, the data processing system 280 may be associated with one or more electronic marketplaces (e.g., online marketplaces), physical (e.g., bricks-and-mortar) marketplaces, fulfillment centers, materials handling facilities, warehouses, distribution centers, cross-docking facilities, order fulfillment facilities, packaging facilities, shipping facilities, rental facilities, libraries, retail stores or establishments, wholesale stores, museums, or any other facilities or systems. Alternatively, the data processing system 280 may be maintained separate and apart (e.g., independent) of or from any such facilities.

The servers 282 may be connected to or otherwise communicate with the processors 284 and the data stores 286, which may store any type of information or data, including but not limited to occupancy data such as building footprints (e.g., square footage and locations of features of such buildings), zoning designations, ground surfaces, bodies of water, or other features that may be determined from GIS data, digital elevation model data, digital terrain model data, orthoimages (or orthophotos), or other information or data regarding regions, geographic maps of areas within such regions, population data, paths or routes, ground features, or other information or data, such as courses, speeds, altitudes, orientations, operating characteristics of such aerial vehicles within such regions.

The servers 282 may be configured to execute one or more algorithms to generate one or more of the maps disclosed herein, including but not limited to geographic maps, population maps or others, or to determine routes or paths to be traveled by aerial vehicles based on such maps, in accordance with one or more search algorithms, or to generate modifications to such maps, routes or paths.

The servers 282 and/or the computer processors 284 may also connect to or otherwise communicate with the network 290 through the sending and receiving of digital data. For example, the data processing system 280 may include any facilities, stations or locations having the ability or capacity to receive and store information or data in one or more data stores, e.g., from the aerial vehicle 210, from one or more other aerial vehicles, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other I/O interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

In some embodiments, the processor 212, the servers 282 and/or the processors 284 may be configured to execute one or more calculations regarding routes or paths to be traveled by the aerial vehicle 210, based on occupancy data, occupancy maps or information or data regarding ground conditions within a vicinity of the aerial vehicle 210, or in a region where the aerial vehicle 210 is operating. In some embodiments, the processor 212, the servers 282 and/or the processors 284 may be configured to generate two-dimensional or three-dimensional models or other representations of population density or other data within one or more regions. In some embodiments, the processor 212, the servers 282 and/or the processors 284 may be configured to determine an optimal path or route between two locations for the execution of a given mission or task by the aerial vehicle 210 or one or more other aerial vehicles (not shown), such as according to any number of algorithms or techniques, including not only an A* search algorithm, but also one or more traditional shortest path or shortest route algorithms such as Dijkstra's Algorithm, Bellman-Ford Algorithm, Floyd-Warshall Algorithm, Johnson's Algorithm or a hub labeling technique. The processor 212, the servers 282 and/or the processors 284 may determine an optimal path or route based on any factor or element, or any other intrinsic or extrinsic factors.

In some embodiments, the processor 212, the server 282 and/or the processors 284 may be configured to execute one or more machine learning systems or techniques. For example, in some embodiments, an artificial neural network or other machine learning system or technique may be trained to receive inputs in the form of information or data regarding population densities within a region, and to generate paths or routes, or modifications to paths or routes, based on outputs generated in response to such inputs. In some other embodiments, the inputs may further include information or data regarding surface features, topography, or terrain features at the one or more locations. In accordance with the present disclosure, an artificial neural network or other machine learning system may be trained in a supervised or unsupervised manner, and may include any number of neurons in any number of layers, including an input layer, an output layer, and one or more intervening hidden layers. A machine learning system, such as an artificial neural network, may be further trained using any information, data or metadata in accordance with embodiments of the present disclosure.

The aerial vehicle 210 and/or the data processing system 280 may use any web-enabled or Internet applications or features, or any other client-server applications or features including E-mail or other messaging techniques, to connect to the network 290, or to communicate with one another. For example, the aerial vehicle 210 may be adapted to transmit information or data in the form of synchronous or asynchronous messages to the data processing system 280 or to any other computer device (e.g., to one or more other aerial vehicles) in real time or in near-real time, or in one or more offline processes, via the network 290. Those of ordinary skill in the pertinent art would recognize that the aerial vehicle 210 or the data processing system 280 may operate or be operated by any of a number of computing devices that are capable of communicating over the network, including but not limited to set-top boxes, mobile devices, laptop computers, desktop computers, smart speakers, electronic book readers, and the like.

The data and/or computer-executable instructions, programs, firmware, software and the like (also referred to herein as "computer-executable" components) described herein may be stored on a computer-readable medium that is within or accessible by computers or computer components such as the processor 212, the servers 282 and/or the processors 284, or any other computers or control systems utilized by the aerial vehicle 210 or the data processing system 280 (e.g., by one or more other aerial vehicles), and having sequences of instructions which, when executed by a processor (e.g., a CPU or GPU), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Any of the algorithms, techniques or functions described herein as being performed or executed by one or more of the processor 212, the memory 214, or the control system 220 of the aerial vehicle 210 may be performed or executed by one or more of the server 282, the processor 284 or the data store 286, or vice versa.

Figure 3A:
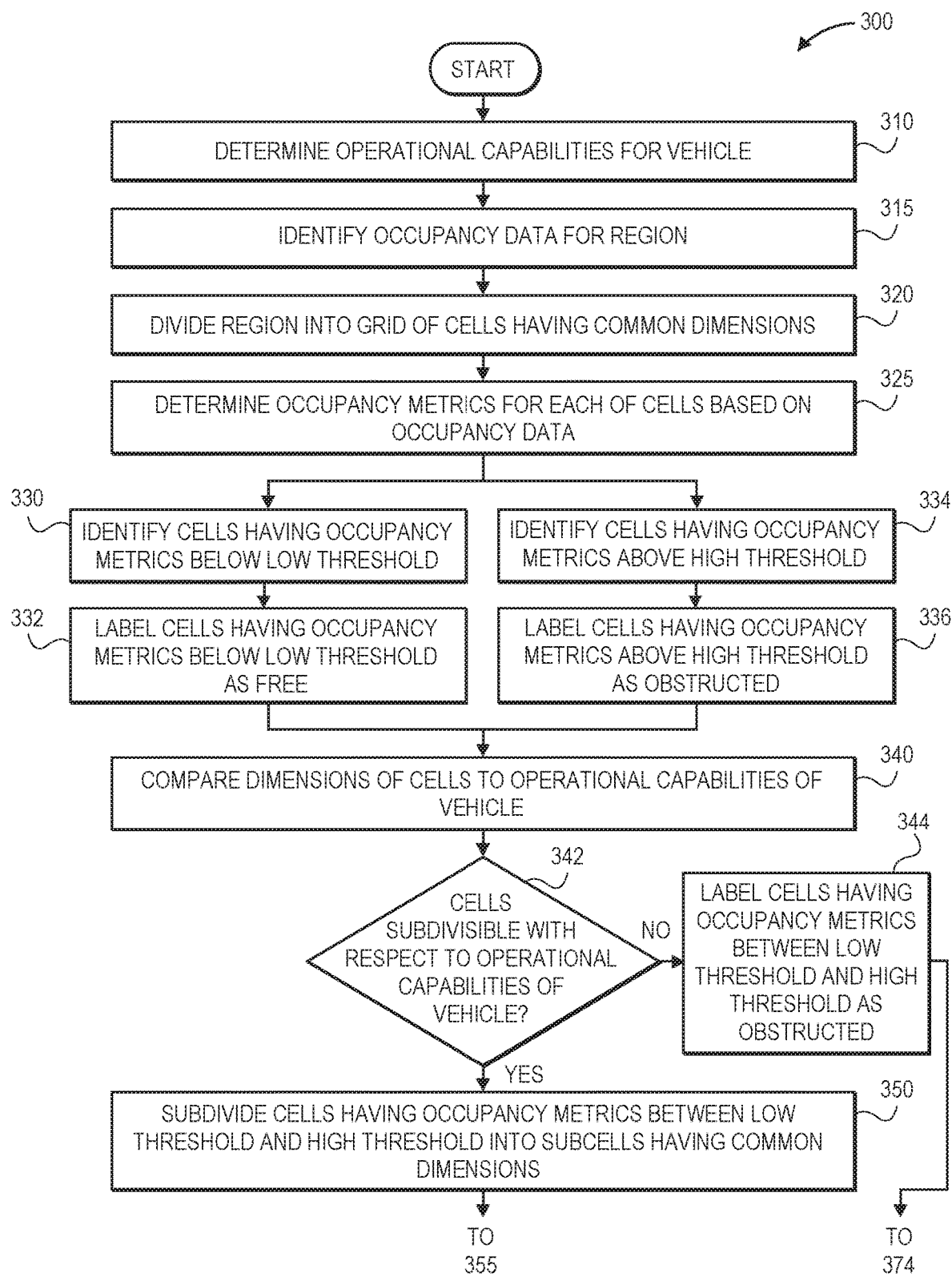
FIGS. 3A and 3B are a flow chart of one process for route or path planning in accordance with embodiments of the present disclosure.
Figure 3B:
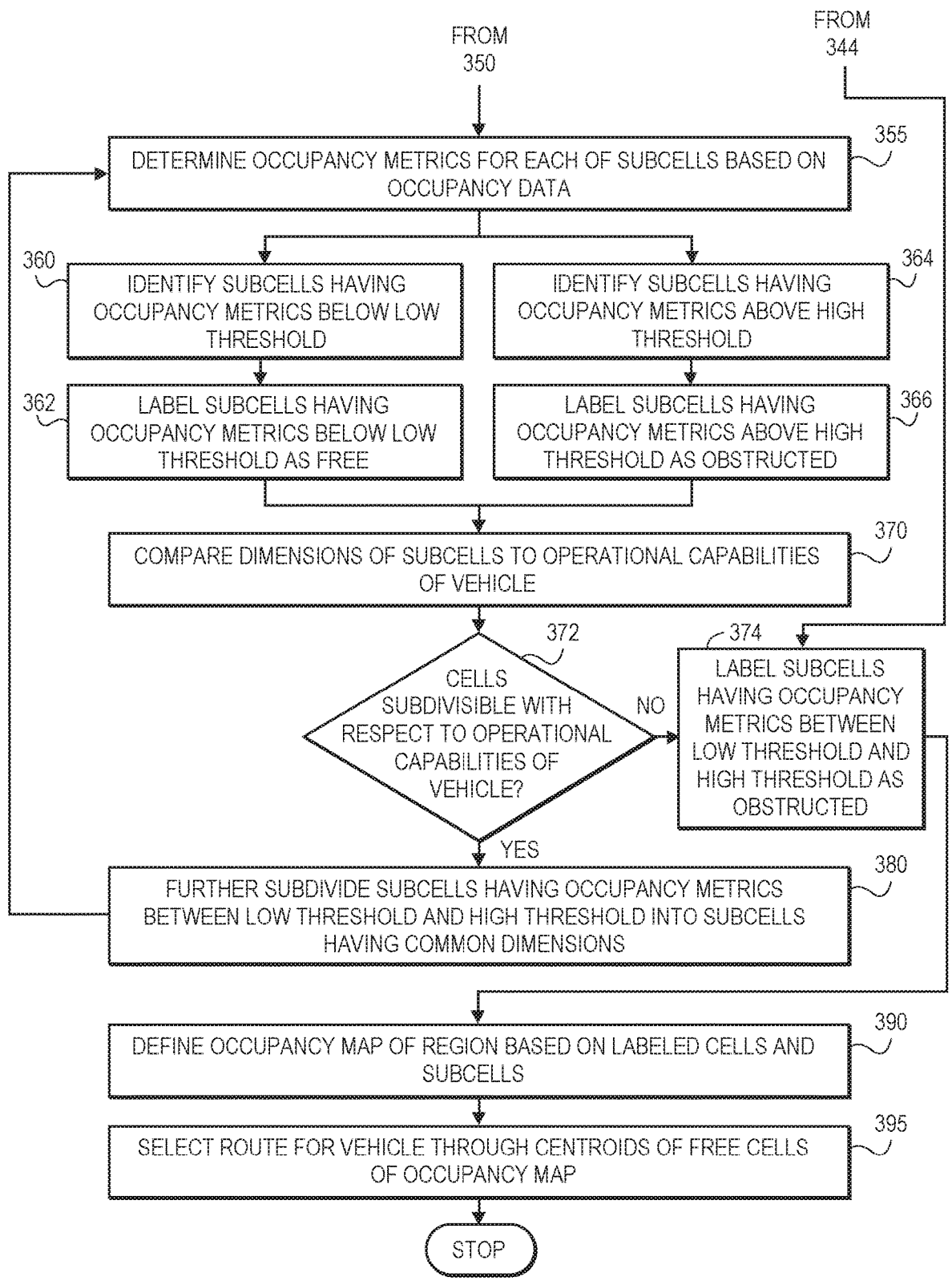

As is discussed above, the systems and methods of the present disclosure are directed to route or path planning for use in selecting paths or routes for travel by vehicles during missions or other flight operations. Referring to FIGS. 3A and 3B, a flow chart 300 of one process for route or path planning in accordance with embodiments of the present disclosure is shown.

At box 310, occupational capabilities of a vehicle are determined. The operational capabilities may include a mass of the vehicle, e.g., empty or also fully loaded, as well as one or more dimensions of the vehicle, such as a wingspan, a length, a height, or any other dimensions. The operational capabilities may also relate to the maneuverability of the vehicle, including but not limited to velocities, accelerations, altitudes, turn radii, climb rates, descent rates, or others, including average, nominal or maximum levels or ranges of such values. The operational capabilities may also relate to operating ranges, power levels (e.g., battery charge or fuel levels), availability (e.g., times or dates), or any other factors relating to the operability of the vehicle.

At box 315, occupancy data is identified for the region. For example, the occupancy data may include data regarding building footprints (e.g., square footage and locations of features of such buildings), zoning designations, ground surfaces, bodies of water, or other features that may be determined from GIS data, digital elevation model data, digital terrain model data, orthoimages (or orthophotos), or others. The occupancy data may also be determined based on a classification of one or more ground features within the region or, alternatively, based on population levels at locations within the region.

At box 320, the region is divided into a grid of cells having common dimensions. For example, the grid may include cells having shapes of squares or other rectangles, which may have common sizes.

In some embodiments, the grid may be defined or applied to the region or a representation (e.g., a geographic map) thereof by aligning at least one side or edge of the grid along at least one side or edge of a ground feature within the region, e.g., a wall or other surface of a building, a parcel of land, a road or street, or another ground feature. In some embodiments, the grid may be defined or applied to the region or a representation thereof by placing at least one corner or vertex of the grid at or near at least one corner or vertex of a ground feature within the region, or along at least one side or edge of the ground feature. In some embodiments, at least one of the lines of the grid may correspond to a line of latitude or a line of longitude within the region.

In some embodiments, the region may be divided by a matrix, a tessellation or some other framework or network of intersecting lines, other than a grid, that forms cells in shapes other than squares or rectangles (e.g., circles, triangles or other shapes). Such cells may have common sizes.

At box 325, occupancy metrics are determined for each of the cells based on the occupancy data. For example, in some embodiments, occupancy metrics may be determined according to one or more algorithms, formulas or techniques, such as by calculating ratios or shares of the respective cells that are covered by or include buildings, e.g., by dividing an area of a cell by total building footprints within the cell. Occupancy metrics may be calculated in a similar manner for objects other than buildings, such as by identifying locations of (or areas occupied by) persons, vehicles or other objects within such cells, and determining an average ratio or share of the respective cells that are occupied by such persons, vehicles or objects. An occupancy metric may be calculated for a cell in any manner, and based on any data, e.g., data regarding populations, zoning designations, local infrastructure, ground surfaces, bodies of water, or other features determined from GIS data, digital elevation model data, digital terrain model data, orthoimages (or orthophotos), or others.

At box 330, cells having occupancy metrics below a low threshold are identified. For example, a threshold below which a cell may be safely or reasonably deemed free of obstructions may be calculated, e.g., 0%, 1%, 5%, or another sufficiently low number, percent or ratio, and occupancy metrics of the cells determined at box 325 may be compared to the threshold. At box 332, cells having occupancy metrics below the low threshold are labeled as free.

In parallel, at box 334, cells having occupancy metrics above a high threshold are identified. For example, a threshold above which a cell may be safely or reasonably deemed to be obstructed may be calculated, e.g., 90%, 95%, 99%, or another sufficiently high number, percent or ratio, and occupancy metrics of the cells determined at box 325 may be compared to the threshold. At box 336, cells having occupancy metrics above the high threshold are labeled as obstructed.

At box 340, dimensions of the cells are compared to the operational capabilities of the vehicle. For example, the dimensions of the cells may be compared to a minimum area (e.g., distances forward or behind the vehicle, or distances lateral to the vehicle) that may be required for the vehicle to safely accelerate or decelerate, climb or descend, turn or hover, or otherwise travel or operate in any manner with respect to a given point in three-dimensional space.

At box 342, whether the cells are subdivisible with respect to the operational capabilities of the vehicle is determined. For example, whether a subcell that is formed by subdividing a cell, e.g., into quadrants of equal sizes and identical shapes, may accommodate the operation of the vehicle may be determined. If the cells are not subdivisible with respect to the operational capabilities of the vehicle, then the process advances to box 344, where the cells having occupancy metrics between the low threshold and the high threshold are labeled as obstructed.

If the cells are subdivisible with respect to the operational capabilities of the vehicle, then the process advances to box 350, where the cells having occupancy metrics between the low threshold and the high threshold are subdivided into subcells having common dimensions. For example, the cells that may neither be deemed obstructed, or free, based on the occupancy metrics calculated at box 325 may be subdivided into a predetermined number of subcells, such as four, where the cells are subdivided into quadrants (e.g., quartered) of equal sizes and common shapes.

At box 355, occupancy metrics are determined for each of the subcells based on the occupancy data identified at box 315. For example, building footprints, zoning designations, ground surfaces, bodies of water or other features within the respective subcells may be identified and compared to the areas of the subcells to calculate an occupancy metric for each of the respective subcells. The occupancy metrics may be calculated according to the same algorithms, formulas or techniques as that were used to determine the occupancy metrics at box 325, or according to one or more other algorithms, formulas or techniques.

At box 360, subcells having occupancy metrics below the low threshold are identified. The low threshold may be the same threshold to which the occupancy metrics of the cells were compared at box 325, or another threshold below which a cell may be safely or reasonably deemed free of obstructions, e.g., 0%, 1%, 5%, or another sufficiently low number, percent or ratio. At box 362, subcells having occupancy metrics below the low threshold are labeled as free.

In parallel, at box 364, subcells having occupancy metrics above a high threshold are identified. The high threshold may be the same threshold to which the occupancy metrics of the cells were compared at box 325, or another threshold above which a cell may be safely or reasonably deemed to be obstructed, e.g., 90%, 95%, 99%, or another sufficiently high number, percent or ratio. At box 366, subcells having occupancy metrics above the high threshold are labeled as obstructed.

At box 370, dimensions of the subcells are compared to the operational capabilities of the vehicle, and at box 372, whether the subcells are subdivisible with respect to the operational capabilities of the vehicle is determined. For example, as is discussed above with regard to box 342, whether subcells formed by subdividing a subcell, e.g., into quadrants of equal sizes and identical shapes, may accommodate the operation of the vehicle may be determined. If the subcells are not subdivisible with respect to the operational capabilities of the vehicle, then the process advances to box 374, where the subcells having occupancy metrics between the low threshold and the high threshold are labeled as obstructed.

If the subcells are further subdivisible with respect to the operational capabilities of the vehicle, then the process advances to box 380, where the subcells having occupancy metrics between the low threshold and the high threshold are further subdivided into subcells having common dimensions. For example, the subcells that may neither be deemed obstructed, or free, based on the occupancy metrics calculated at box 355 may be further subdivided into a predetermined number of subcells, such as four, where the subcells are further subdivided into quadrants (e.g., quartered) of equal sizes and common shapes. The process then returns to box 355, where occupancy metrics are determined for each of the subcells formed by subdivision at box 380 based on the occupancy data identified at box 315.

At box 390, after cells and/or subcells have been labeled as obstructed or free at box 332, box 336, box 344, box 362, box 366, or box 374, an occupancy map of the region is defined based on the labeled cells and subcells. For example, the occupancy map may identify portions of the region that have been determined to be obstructed, and portions of the region that have been determined to be free, based on the labels assigned to the respective cells and subcells. At box 395, once the occupancy map has been defined, the occupancy map is used to select a route comprising a plurality of paths for travel by the vehicle through the centroids of free cells and/or subcells within the occupancy map, and the process ends. For example, a search algorithm such as an A* search algorithm may calculate a unitless measure of cost associated with traveling from an origin within or outside of the occupancy map to a destination within or outside of the occupancy map, e.g., through centroids of the various cells of the occupancy map. Moreover, in some embodiments, a plurality of occupancy maps may be defined for a region based on the respective operational capabilities of a plurality of vehicles, and used to determined routes or paths between points within the region for travel by such vehicles during the performance of one or more missions. The occupancy maps, or the routes or paths determined therefrom, may be used to select one of the vehicles to perform the one or more missions.

As is discussed above, occupancy maps may be defined from occupancy metrics calculated for a plurality of cells in a map of a region based on data such as building footprints, zoning designations, local infrastructure, ground surfaces, bodies of water, or other features within such cells. Referring to FIGS. 4A through 4G, views of aspects of one system for route or path planning in accordance with embodiments of the present disclosure are shown. Except where otherwise noted, reference numerals preceded by the number "4" shown in FIGS. 4A through 4G indicate components or features that are similar to components or features having reference numerals preceded by the number "2" shown in FIG. 2 or by the number "1" shown in FIGS. 1A through 1G.

Figure 4A:
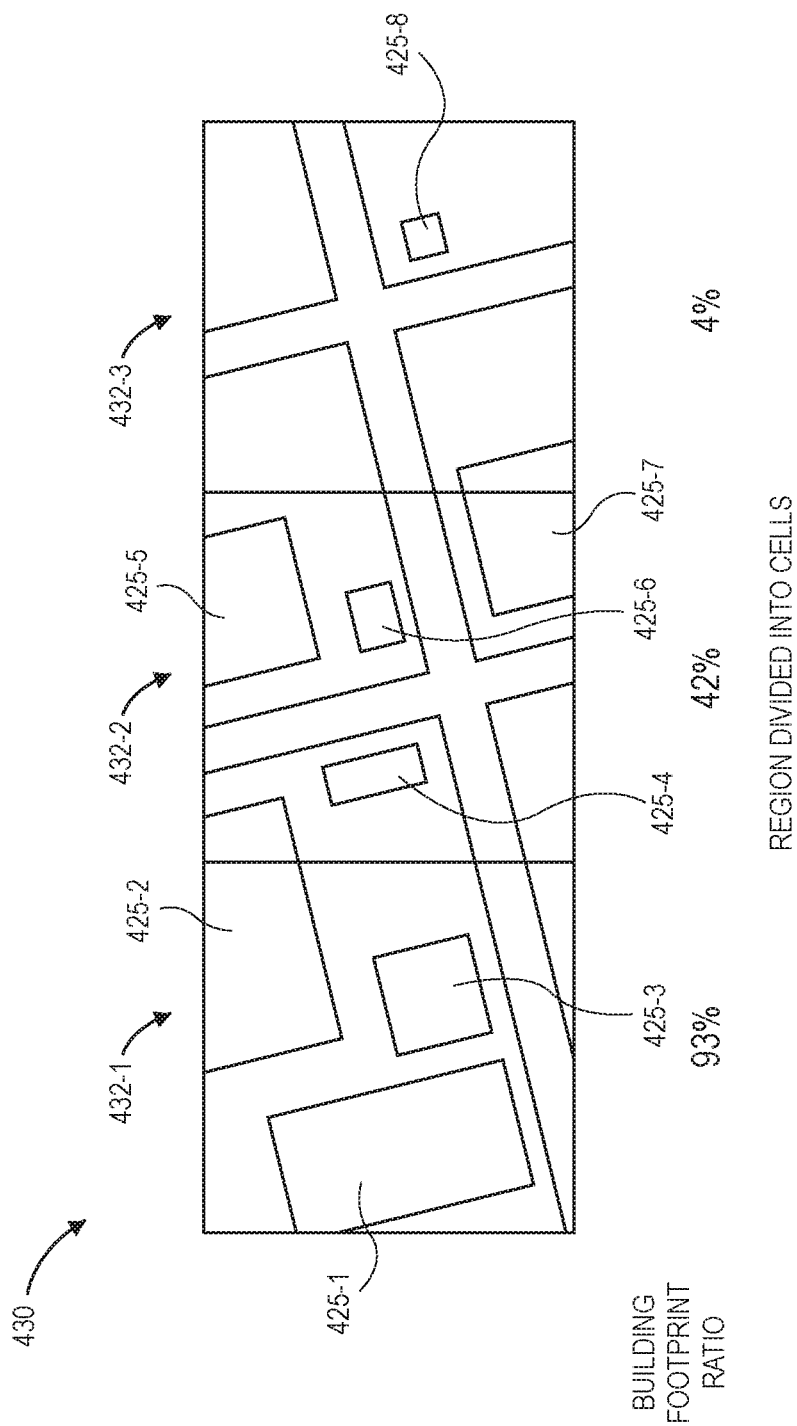

As is shown in FIG. 4A, a grid 430 is applied to a region including a plurality of buildings 425-1, 425-2, 425-3, 425-4, 425-5, 425-6, 425-7, 425-8 and various other ground-based systems (e.g., infrastructure). The grid 430 includes a plurality of cells 432-1, 432-2, 432-3.

As is also shown in FIG. 4A, ratios of building footprints or other occupancy metrics are calculated for each of the cells 432-1, 432-2, 432-3. For example, the cell 432-1, which includes the building 425-3 and portions of the buildings 425-1, 425-2, has a significantly high building footprint ratio of ninety-three percent (93%), while the cell 432-3, which includes the building 425-8 and a portion of the building 425-7, has a significantly low building footprint ratio of four percent (4%). The cell 432-2, which includes the buildings 425-4, 425-6 and portions of the buildings 425-2, 425-5, 425-7, has a building footprint ratio of forty-two percent (42%).

Figure 4B:
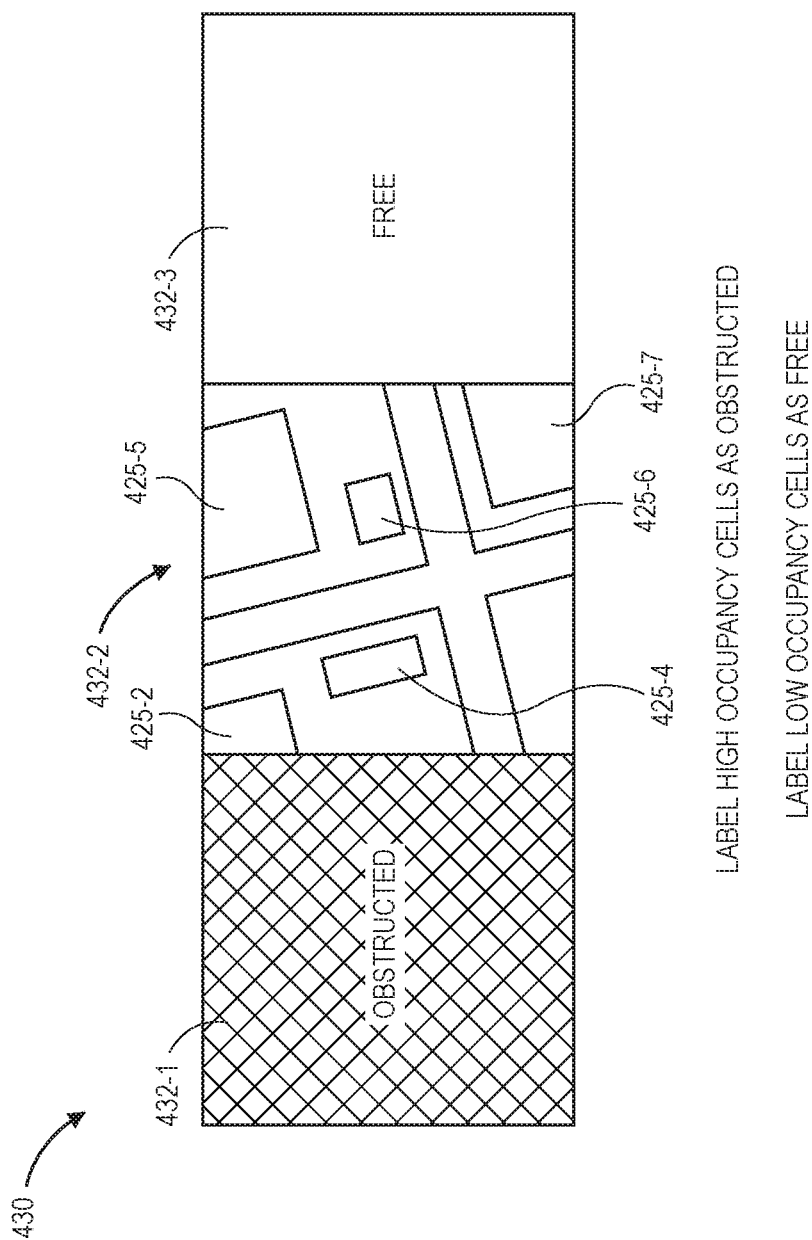

As is shown in FIG. 4B, labels of "obstructed" and "free" may be assigned to the cells 432-1, 432-3, respectively, based on their respective building footprint ratios. For example, where a cell, such as the cell 432-1, is mostly or entirely occupied by buildings or other structures, as represented by a building footprint ratio above a sufficiently high threshold, e.g., above or near eighty percent (80%), ninety percent (90%), one hundred percent (100%), or others, the cell 432-1 may be deemed to be substantially obstructed, and assigned a label reflecting this condition of occupancy. Where a cell, such as the cell 432-3, is mostly or entirely free of buildings or other structures, as represented by a building footprint ratio below a sufficiently low threshold, e.g., below or near twenty percent (20%), ten percent (10%), zero percent (0%), or others, the cell 432-3 may be deemed to be substantially free of obstructions, and assigned a label reflecting this condition of occupancy.

Figure 4C:
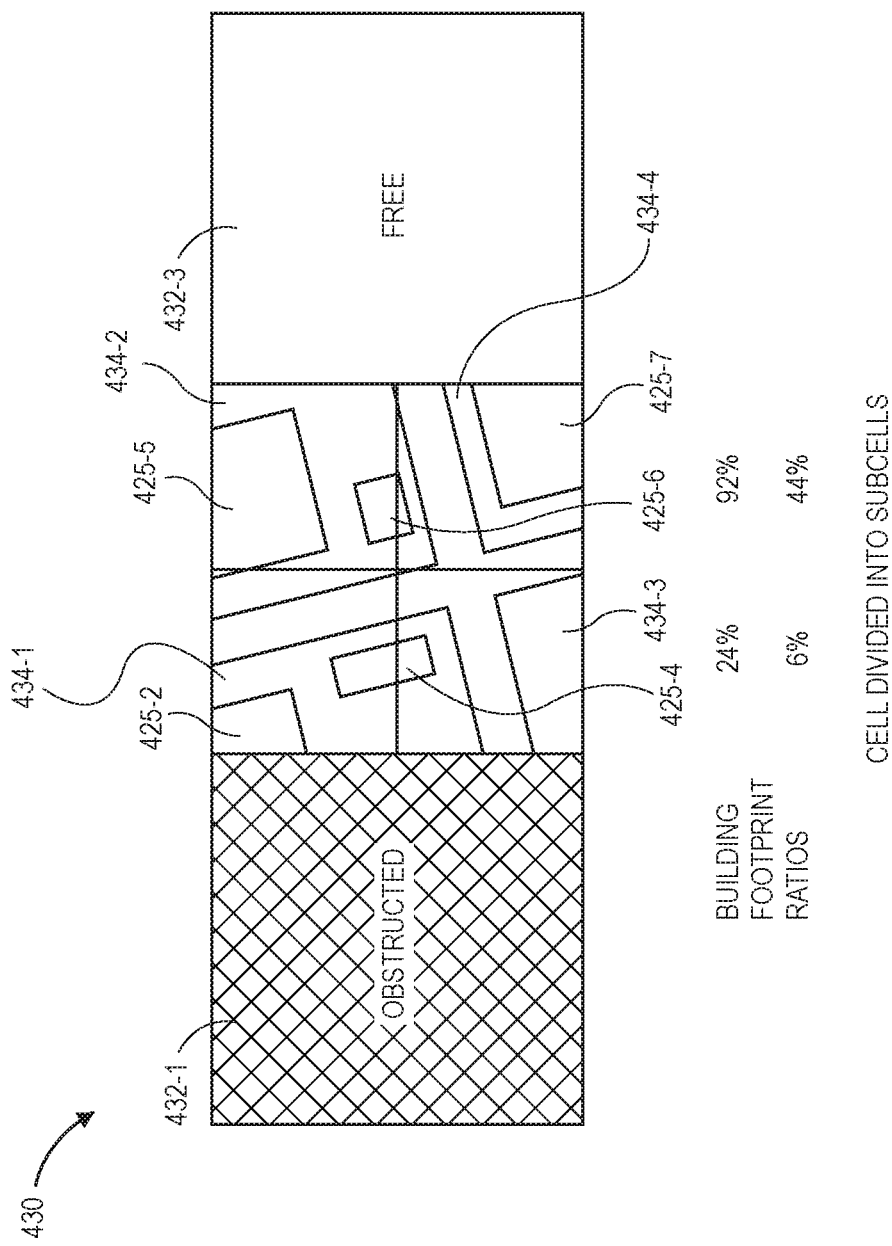

In accordance with embodiments of the present disclosure, cells having building footprint ratios between the high threshold and the low threshold, e.g., the cell 432-2, may be divided or subdivided into a plurality of cells (e.g., subcells), and building footprint ratios may be calculated for the cells formed by the division or subdivision. As is shown in FIG. 4C, the cell 432-2 is divided into subcells 434-1, 434-2, 434-3, 434-4, and building footprint ratios of twenty-four percent (24%), ninety-two percent (92%), six percent (6%) and forty-four percent (44%), respectively, are calculated for each of the subcells 434-1, 434-2, 434-3, 434-4 based on the portions of the buildings 425-2, 425-4, 425-5, 425-6, 425-7 that are located within such subcells 434-1, 434-2, 434-3, 434-4.

Figure 4D:
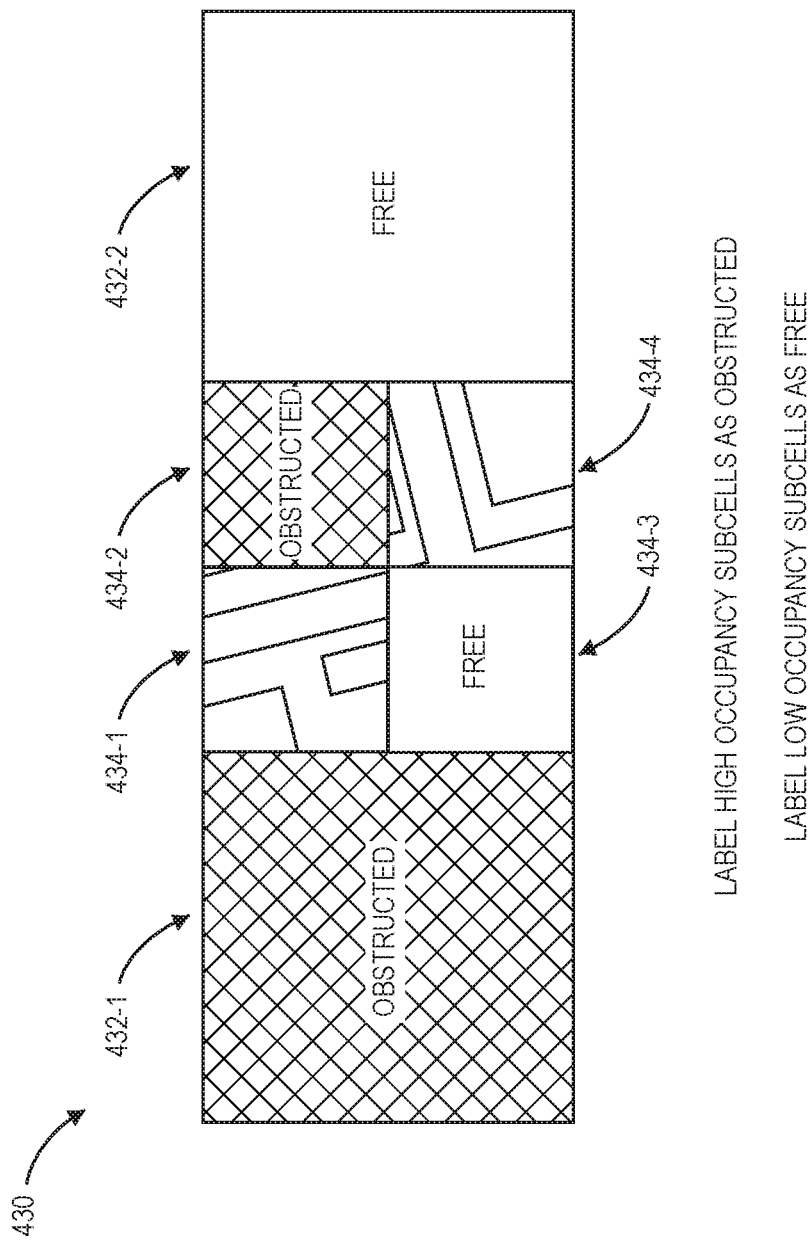

As is shown in FIG. 4D, because the subcell 434-2 has a sufficiently high building footprint ratio, e.g., above the high threshold, a label of obstructed is assigned to the subcell 434-2. Likewise, because the subcell 434-3 has a sufficiently low building footprint ratio, e.g., above the low threshold, a label of free is assigned to the subcell 434-3.

Figure 4E:
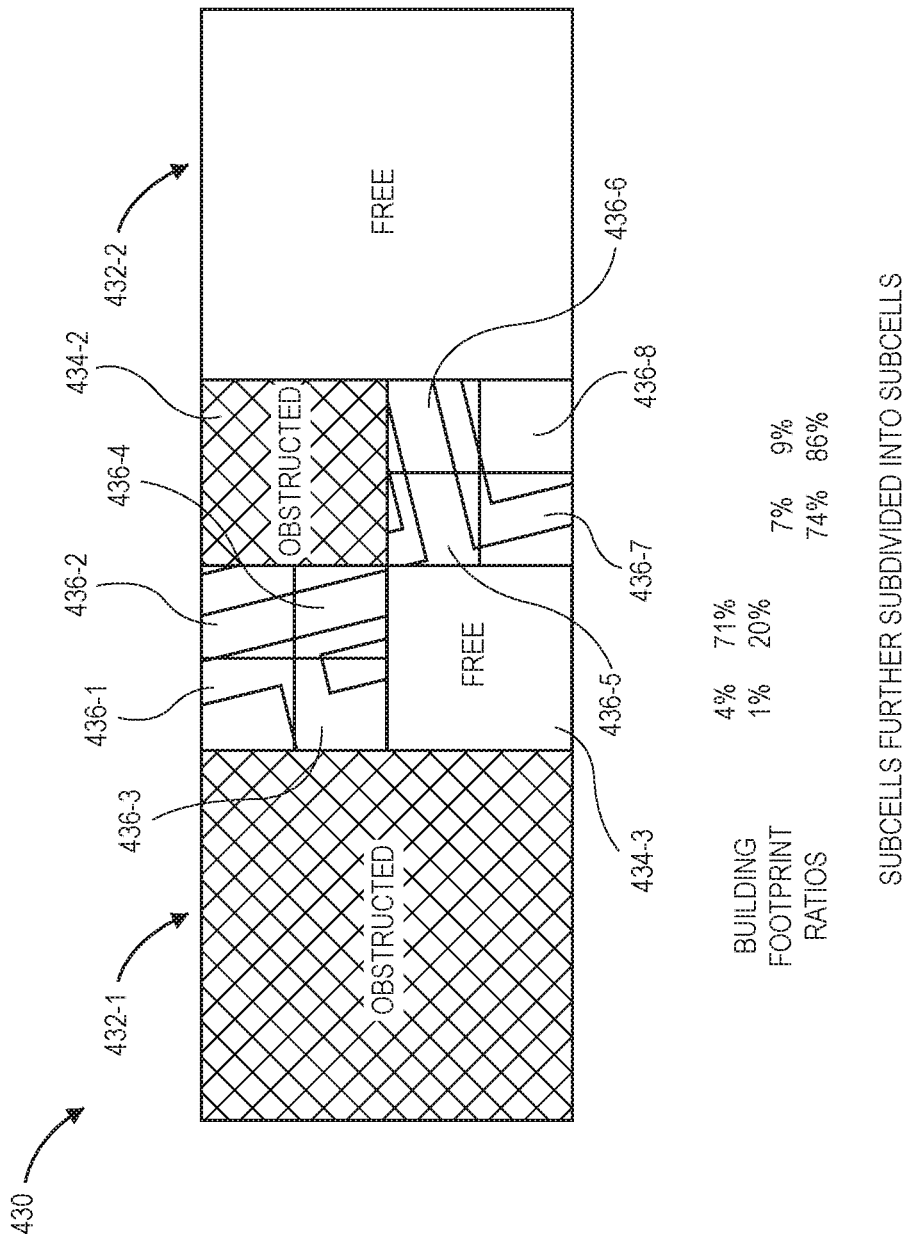

As is shown in FIG. 4E, the subcells 434-1, 434-4 for which building footprint ratios between the high threshold and the low threshold were calculated, may be further divided or subdivided into a plurality of subcells 436-1, 436-2, 436-3, 436-4 and 436-5, 436-6, 436-7, 436-8, respectively. As is also shown in FIG. 4E, building footprint ratios of four percent (4%), seventy-one percent (71%), one percent (1%) and twenty percent (20%) are calculated for each of the subcells 436-1, 436-2, 436-3, 436-4, respectively. As is further shown in FIG. 4E, building footprint ratios of seven percent (7%), nine percent (9%), seventy-four percent (74%) and eighty-six percent (86%) are calculated for each of the subcells 436-5, 436-6, 436-7, 436-8, respectively.

As is shown in FIG. 4F, because the subcells 436-2, 436-7, 436-8 have sufficiently high building footprint ratios, e.g., above the high threshold, a label of obstructed is assigned to the subcells 436-2, 436-7, 436-8. Because the subcells 436-1, 436-3, 436-4, 436-5, 436-6 have sufficiently low building footprint ratios, e.g., below the low threshold, a label of free is assigned to the subcells 436-1, 436-3, 436-4, 436-5, 436-6.

Figure 4G:
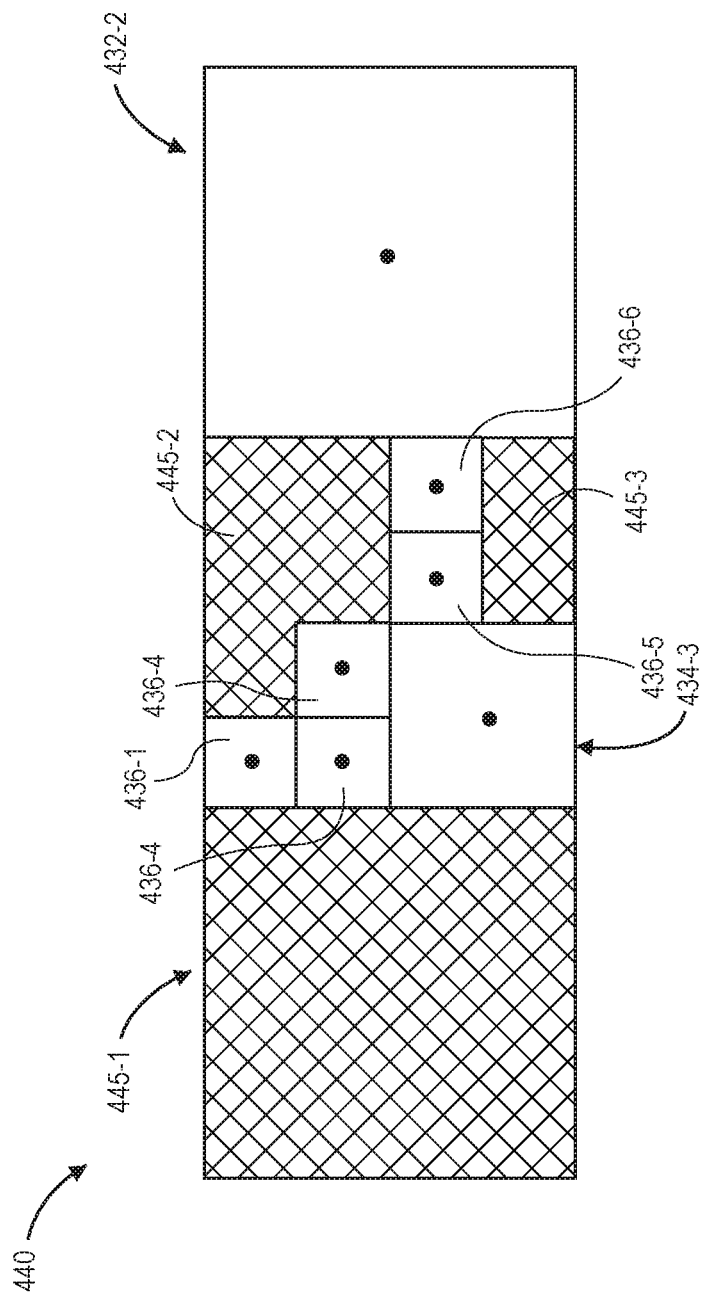

After the region has been sufficiently divided or subdivided into cells or subcells, and the cells or subcells have been labeled based on values of their respective building footprint ratios or other occupancy metrics, an occupancy map may be defined by aggregating adjacent cells or subcells that are labeled as "obstructed," and identifying cells or subcells that are labeled as "free." As is shown in FIG. 4G, an occupancy map 440 includes a plurality of sectors 445-1, 445-2, 445-3 of obstructed cells and/or subcells. The sector 445-1 is determined to be obstructed based on the label assigned to the cell 432-1 shown in FIG. 4F, as determined by the building footprint ratio of the cell 432-1. The sector 445-2 is determined to be obstructed based on the labels assigned to the subcells 434-2, 436-2 shown in FIG. 4F, as determined by the building footprint ratios of the subcells 434-2, 436-2, which contact one another. The sector 445-3 is determined to be obstructed based on the labels assigned to the subcells 436-7, 436-8, as determined by the building footprint ratios of the subcells 436-7, 436-8 shown in FIG. 4F.

In some embodiments, the occupancy map 440 may be derived upon determining that further subdivision of the subcells 436-1, 436-3, 436-4, 436-5, 436-6 would result in subcells that are smaller than an area calculated for a given vehicle based on its operating capabilities, or on any other basis. Additionally, in some embodiments, the occupancy map 440 may be utilized to determine one or more routes or paths for the vehicle, e.g., through centroids of the cells or subcells 432-2, 434-3, 436-1, 436-2, 436-3, 436-5, 436-6 that have been labeled as free. Such routes or paths may be determined or selected according to a search algorithm, or a cost minimization algorithm, such as an A* search algorithm.

Although the occupancy map 440 is defined from cells and subcells that are labeled based on their respective building footprint ratios, as applied to one or more thresholds, those of ordinary skill in the pertinent arts will recognize that a cell or a subcell may be labeled based on any other occupancy metric, e.g., on a static and/or a dynamic basis, and that the systems and methods for defining occupancy maps as described herein are not limited to building footprint ratios.

As is discussed above, a region or a map or other representation thereof may be divided into cells, and further subdivided (e.g., into subcells), as necessary, where a label for any of the cells may not be readily determined based on an occupancy metric calculated for such cells. The division or subdivision of cells may continue as long as areas of the cells resulting from division or subdivision are not less than areas defined for one or more vehicles based on their respective operating capabilities.

Figure 5A:
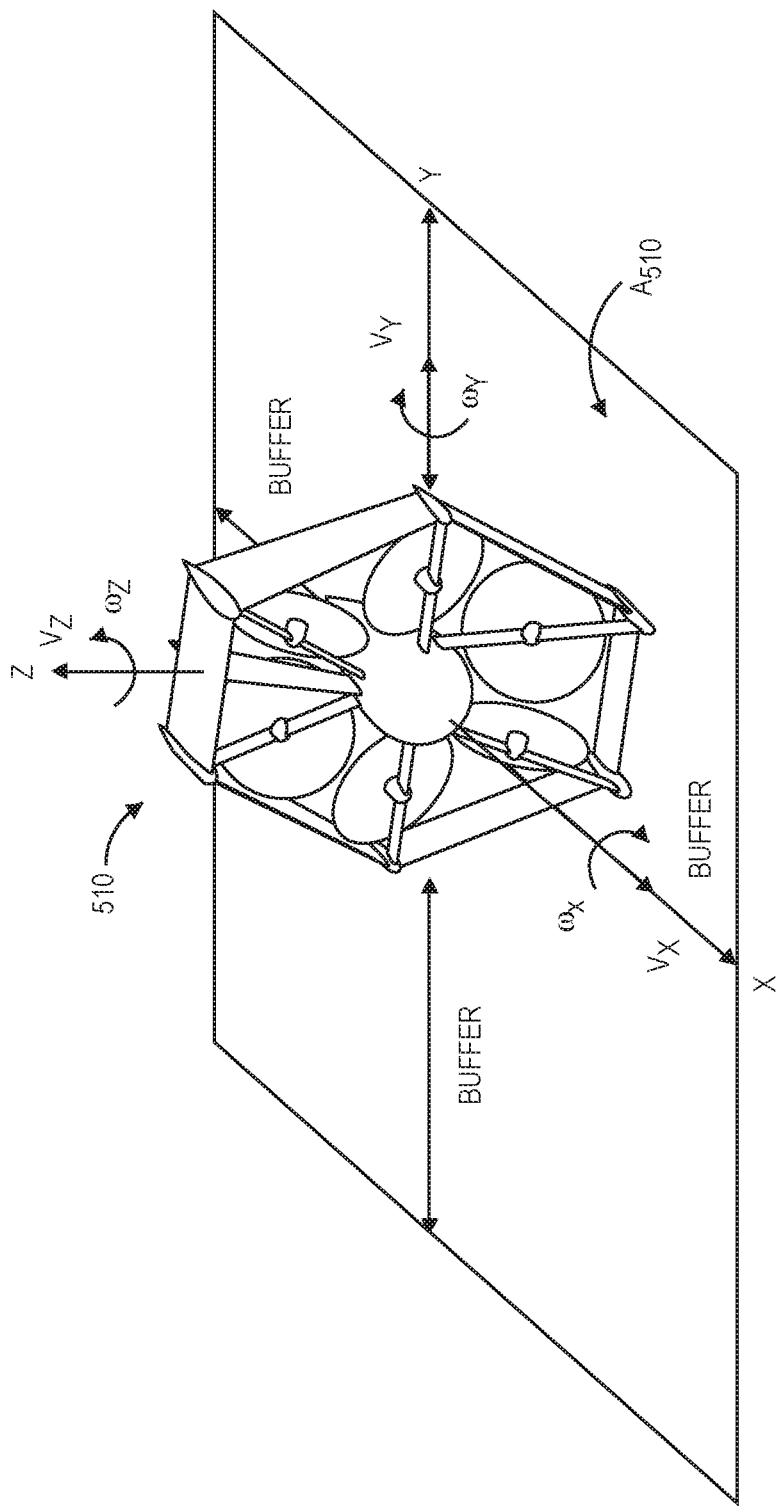
FIGS. 5A and 5B are views of aspects of one system for route or path planning in accordance with embodiments of the present disclosure.
Figure 5B:
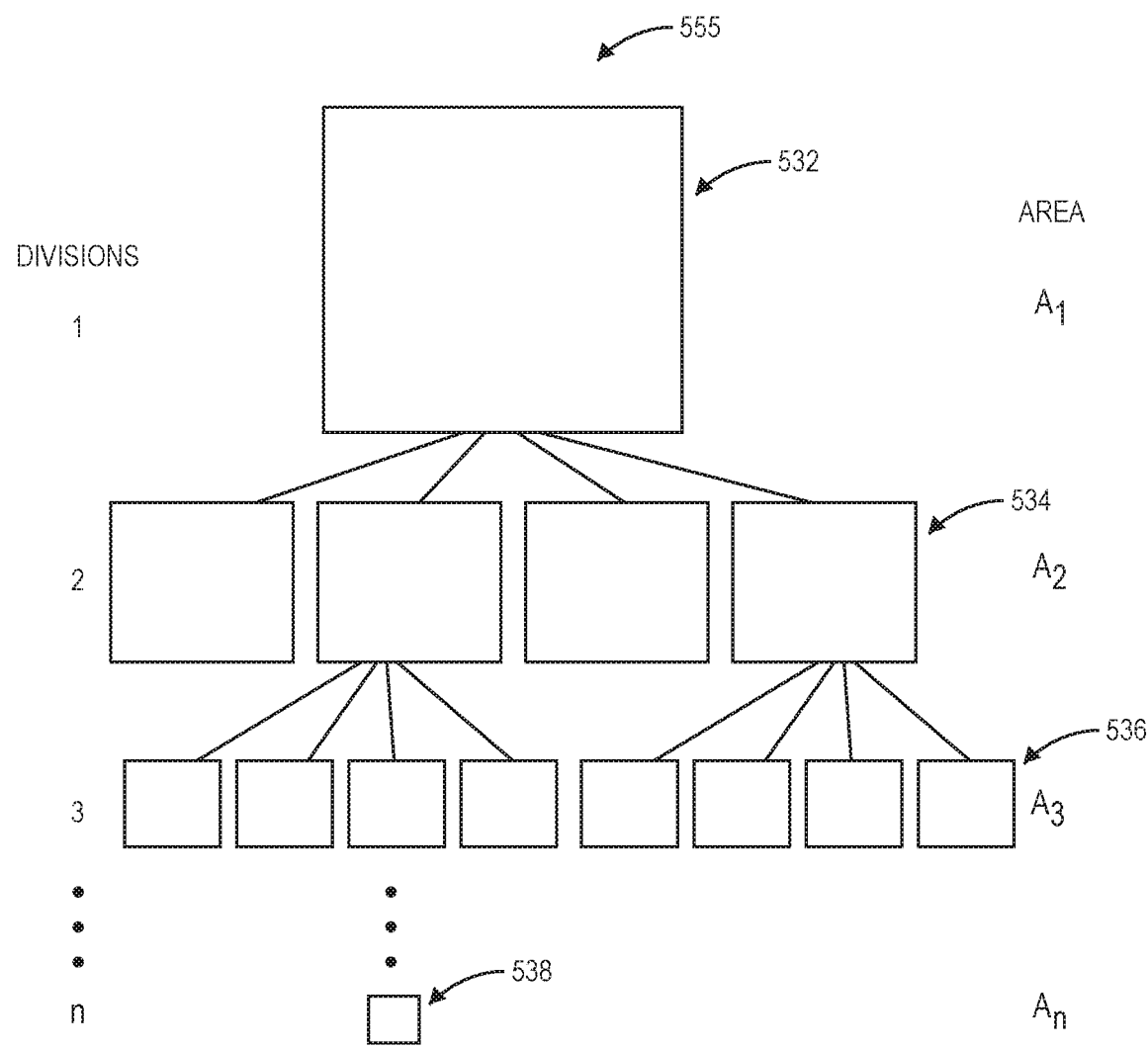

Referring to FIGS. 5A and 5B, views of aspects of one system for route or path planning in accordance with embodiments of the present disclosure are shown. Except where otherwise noted, reference numerals preceded by the number "5" shown in FIGS. 5A and 5B indicate components or features that are similar to components or features having reference numerals preceded by the number "4" shown in FIGS. 4A through 4G, by the number "2" shown in FIG. 2 or by the number "1" shown in FIGS. 1A through 1G.

As is shown in FIG. 5A, an aerial vehicle 510 is configured to operate with respect to six degrees of freedom, viz., translational and rotational velocities along or about three axes. For example, as is shown in FIG. 5A, the aerial vehicle 510 may be constructed, configured or designed to operate at a translational velocity $V_x$ along an x-axis (or a roll axis), and at a rotational velocity $\omega_x$ about the x-axis (or roll axis). The velocities $V_x$, $\omega_x$ may be average, nominal or maximum levels or ranges of translational and/or rotational velocities along or about the x-axis. The aerial vehicle 510 may further have a translational velocity $V_y$ and a rotational velocity $\omega_y$ along and about the y-axis (or pitch axis), and a translational velocity $V_z$ and a rotational velocity $\omega_z$ along and about the z-axis (or yaw axis). The velocities $V_y$, $\omega_y$ and the velocities $V_z$, $\omega_z$ may also be average, nominal or maximum levels or ranges of translational and/or rotational velocities along or about the y-axis and the z-axis, respectively.

As is also shown in FIG. 5A, an area $A_{510}$ may be defined for an aerial vehicle 510 based on its operational capabilities relating to the maneuverability of the vehicle, including not only the translational velocities $V_x$, $V_y$, $V_z$ or the rotational velocities $\omega_x$, $\omega_y$, $\omega_z$, but also any other operational capabilities. For example, the area $A_{510}$ may take into account not only distances required, both in forward or reverse directions and also laterally, that may be required in order to accelerate or decelerate within ranges of the translational velocities $V_x$, $V_y$, $V_z$ or the rotational velocities $\omega_x$, $\omega_y$, $\omega_z$, but also buffers or margins associated with such distances. Alternatively, or additionally, the area $A_{510}$ may be defined with respect to one or more other operational capabilities, including but not limited to accelerations, altitudes, turn radii, climb rates, descent rates, or others, including average, nominal or maximum levels or ranges of such levels. The operational capabilities may also relate to operating ranges, power levels (e.g., battery charge or fuel levels), availability (e.g., times or dates), or any other factors relating to the operability of the vehicle.

The area $A_{510}$ defined with respect to the operational capabilities of the aerial vehicle 510 may serve as a limit or a bound on an extent to which cells (or subcells) may be further divided (or subdivided) to the extent that occupancy metrics calculated for such cells are between thresholds associated with an obstructed state or condition and a free state or condition for such cells. For example, as is shown in FIG. 5B, a quad tree 555 or other data structure representing the generation of cells and their respective areas is shown. The quad tree 555 begins with a cell 532 having an area $A_1$. If the cell 532 having the area $A_1$ may not be labeled as obstructed or free based on an occupancy metric (e.g., a building footprint ratio or any other metric indicative of an occupancy of the cell 532), such as where the occupancy metric falls between a threshold above which the cell 532 may be labeled as obstructed and a threshold below which the cell 532 may be labeled as free, the cell 532 may be divided (or subdivided) into four cells (or subcells) 534, or any other number of cells, each having an area $A_2$, if the area $A_2$ would be greater than the area $A_{510}$ defined for the aerial vehicle 510 based on its operational capabilities.

Once the cell 532 having the area $A_1$ has been divided or subdivided, occupancy metrics may be calculated for each of the cells 534 having the area $A_2$. To the extent that one or more of the cells 534 having the area $A_2$ may not be labeled as either obstructed or free based on their respectively calculated occupancy metrics, the cells 534 may be further divided (or subdivided) into four cells 536 having an area $A_3$, if the area $A_3$ would be greater than the area $A_{510}$.

The division or subdivision of cells, as shown in the quad tree 555 of FIG. 5B, may occur for any number n of iterations until an area of cells 538 that would be formed by a further iteration of division or subdivision, or $A_{(n+1)}$, would be smaller than the area $A_{510}$. In such instances, any cells 538 having an area $A_n$ having occupancy metrics above the threshold below which the cells 538 may be labeled as free may instead be labeled as obstructed. An occupancy map may then be formed by aggregating cells (or subcells) that are labeled as obstructed, and used to determine routes or paths through centroids of cells (or subcells) that are labeled as free, such as is shown in FIG. 1G or 4G.

Figure 6:
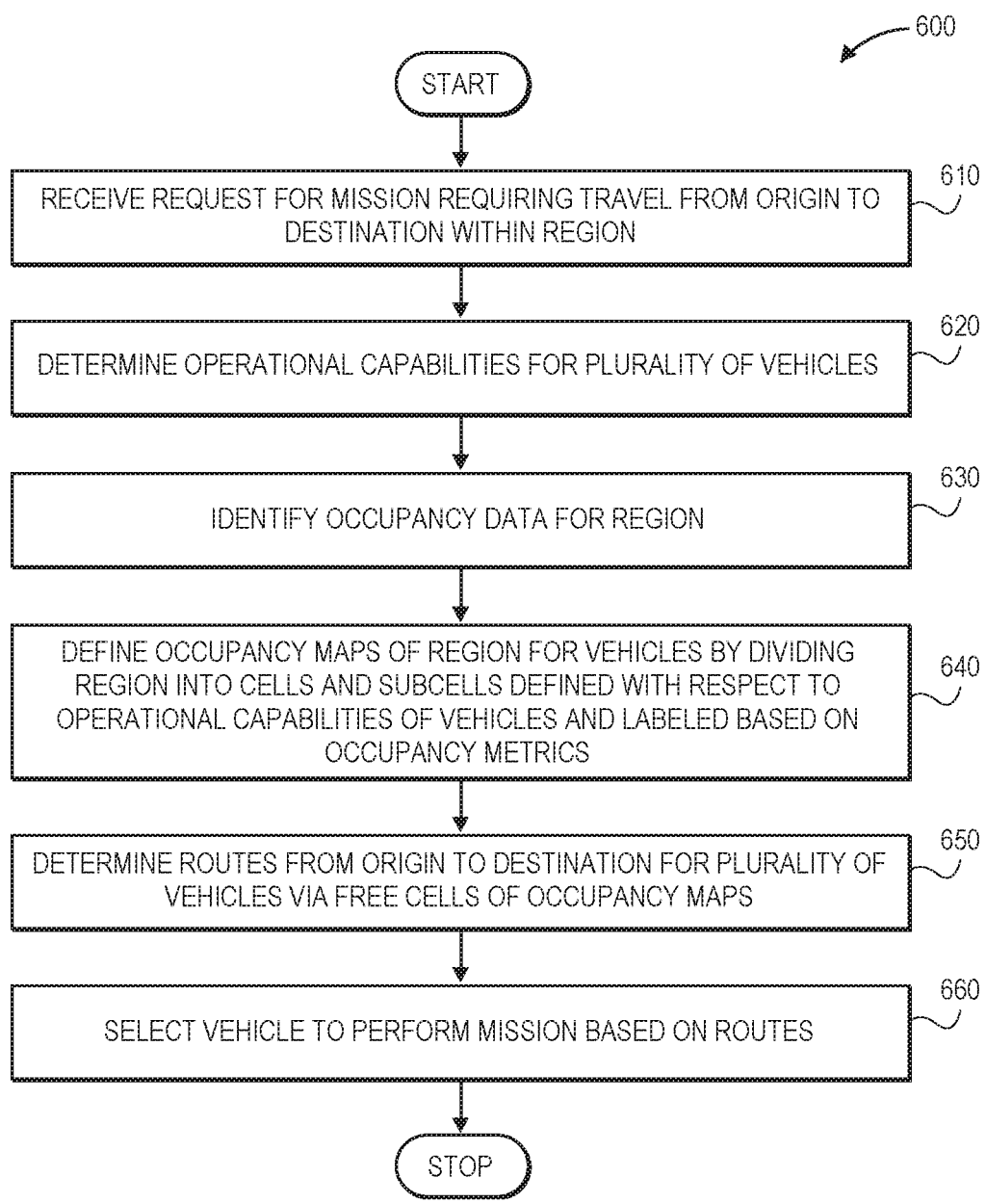
FIG. 6 is a flow chart of one process for route or path planning in accordance with embodiments of the present disclosure.

As is discussed above, occupancy maps may be defined for a region based on occupancy data for the region and the respective operational capabilities of one or more vehicles (or classes of vehicles). The occupancy maps may be used to select one of the vehicles to perform a mission requiring travel between at least two points within the region. Referring to FIG. 6, a flow chart 600 of one process for route or path planning in accordance with embodiments of the present disclosure is shown.

At box 610, a request for a mission requiring travel from an origin to a destination within a region is received. For example, the request may be received in connection with an order for a delivery of any type or form of item, e.g., consumer goods, pharmaceuticals or other medical supplies, prepared foods, or any other items. In some embodiments, both the origin and the destination may be located within the region. Alternatively, in some embodiments, one of the origin or the destination may be located within the region, and one of the origin or the destination may be located outside of the region. In still other embodiments, neither the origin nor the destination need be located within the region. Instead, the region may be located between the origin and the destination, and the mission may require travel through the region.

At box 620, operational capabilities are determined for each of a plurality of vehicles. For example, such operational capabilities may relate to average, nominal or maximum levels or ranges of velocities or accelerations along or about any axes, e.g., principal axes of the vehicles, or any other values associated with capabilities of the vehicles.

At box 630, occupancy data is identified for the region. For example, the occupancy data may include data regarding building footprints (e.g., square footage and locations of features of such buildings), zoning designations, ground surfaces, bodies of water, or other features that may be determined from GIS data, digital elevation model data, digital terrain model data, orthoimages (or orthophotos), or others.

At box 640, occupancy maps are defined for the region by dividing the region into cells and subcells defined with respect to the operational capabilities of the vehicles and labeled based on the corresponding occupancy metrics. For example, a geographic map of the region may be divided into cells and occupancy metrics may be calculated for each of such cells. Cells that may be deemed obstructed or free, e.g., where such occupancy metrics exceed or fall below one or more thresholds, are labeled accordingly. Cells that may not be deemed obstructed or free are divided or subdivided accordingly, and occupational metrics of cells or subcells that are formed by division or subdivision may be compared to such thresholds and labeled accordingly. Where a cell or subcell to be formed by division or subdivision would have an area less than that of areas defined with respect to the operational capabilities of each of such vehicles, the division or subdivision of cells or subcells may end. Occupancy maps may be defined for each of such vehicles by aggregating the cells or subcells that have been labeled as obstructed, and by identifying the cells or subcells that have been labeled as free.

At box 650, routes from the origin to the destination via free cells of the occupancy maps defined at box 640 are determined for each of the plurality of vehicles. For example, the occupancy maps and the locations of the origin and the destination may be provided to a search algorithm, which may select routes for performing the mission by each of the vehicles through free cells or subcells shown in the respective occupancy maps, e.g., to maximize a level of reliability of the routes, to minimize a level of unreliability for the routes, or in any other manner or on any other basis. In some embodiments, routes may be selected according to a search algorithm, e.g., an A* search algorithm, or any other route or path planning algorithm, and the routes through centroids of the respective free cells or subcells may be determined accordingly.

At box 660, a vehicle is selected to perform the mission based on the routes determined at box 650, and the process ends. For example, a route having a shortest travel time, a smallest transit cost, a largest margin between one or more paths of the route and an obstructed cell, or any other attribute or value may be identified, and the vehicle for which the route is determined may be selected to perform the mission accordingly.

Figure 7:
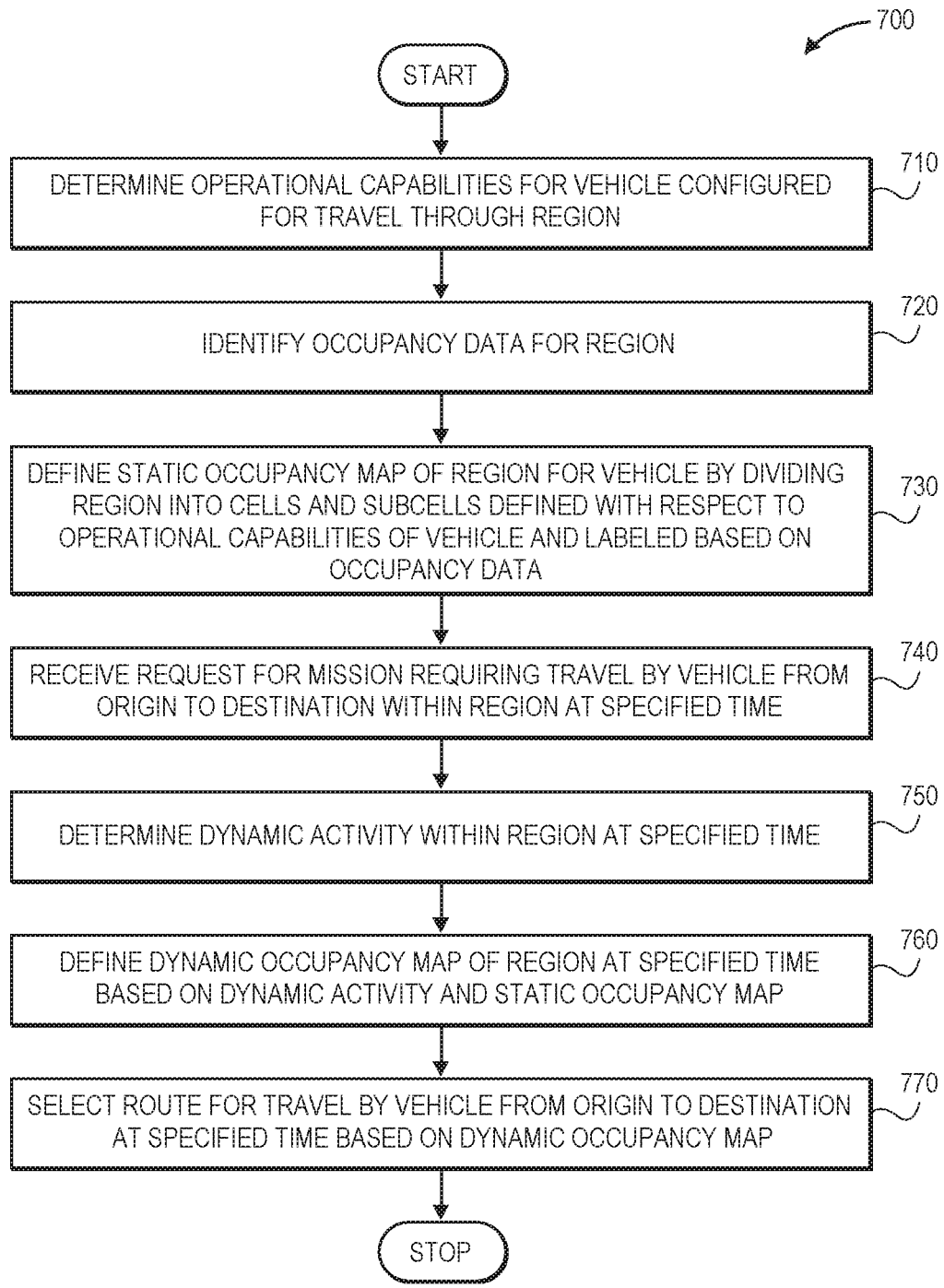
FIG. 7 is a flow chart of one process for route or path planning in accordance with embodiments of the present disclosure.

Occupancy maps may be derived for one or more vehicles based not only on static occupancy metrics representing standard or typical levels of occupancy within a region but also dynamic occupancy metrics representing temporary or current levels of occupancy within or above the region, including but not limited to structures of a short-term nature (e.g., scaffolding or other features at construction sites) or vehicle traffic (e.g., airborne or ground vehicle traffic). Referring to FIG. 7, a flow chart 700 of one process for route or path planning in accordance with embodiments of the present disclosure is shown. At box 710, operational capabilities are determined for a vehicle. Such operational capabilities may relate to average, nominal or maximum levels or ranges of velocities or accelerations along or about any axes, e.g., principal axes of the vehicles, or any other values associated with capabilities of the vehicle.

At box 720, occupancy data is identified for the region. For example, the occupancy data may include data regarding building footprints (e.g., square footage and locations of features of such buildings), zoning designations, ground surfaces, bodies of water, or other features that may be determined from GIS data, digital elevation model data, digital terrain model data, orthoimages (or orthophotos), or others.

At box 730, a static occupancy map is defined for the region by dividing the region into cells and subcells defined with respect to the operational capabilities of the vehicle and labeled based on the occupancy data. For example, a geographic map of the region may be divided into cells and occupancy metrics may be calculated for each of such cells. Cells that may be deemed obstructed or free, e.g., where such occupancy metrics exceed or fall below one or more thresholds, are labeled accordingly. Cells that may not be deemed obstructed or free are divided or subdivided accordingly, and occupational metrics of cells or subcells that are formed by division or subdivision may be compared to such thresholds and labeled accordingly. Where a cell or subcell to be formed by division or subdivision would have an area less than that of areas defined with respect to the operational capabilities of each of the vehicle, the division or subdivision of cells or subcells may end, and the static occupancy map may be defined for the vehicle by aggregating the labels of such cells or subcells.

At box 740, a request for a mission requiring travel by the vehicle from an origin within the region to a destination within the region at a specific time is received. The mission may relate to an order for a delivery of any type or form of item, e.g., consumer goods, pharmaceuticals or other medical supplies, prepared foods, or any other items. Alternatively, in some embodiments, one or both of the origin or the destination need not be located within the region.

At box 750, dynamic activity data within the region at a specified time is determined. For example, the dynamic activity data may reflect ground-based or airborne activity within the region, including vehicular traffic (e.g., cars, trucks, buses or the like), events, construction, or the like on the ground within the region, as well as vehicular traffic (e.g., airplanes, helicopters, drones, balloons or the like) in the air above the region. Dynamic activity data may also relate to specific uses or restrictions on use of ground surfaces or airspace above such ground surfaces, or any other limitations or requirements.

At box 760, a dynamic occupancy map of the region at the specified time is defined based on the dynamic activity and the static occupancy map. For example, where a static occupancy map includes a number of individual cells or subcells that have been labeled as "free," the dynamic activity data may be applied to the individual cells or subcells to determine whether such cells or subcells remain free in view of the dynamic activity data. To the extent that a cell or subcell of the static occupancy map is appropriately labeled as "obstructed" based on the occupancy data identified for the region, the cell or subcell may remain labeled as such, regardless of the dynamic activity data.

To the extent that a cell or subcell of the static occupancy map is appropriately labeled as free based on the occupancy data, however, the dynamic activity data for that cell or subcell may be considered in determining whether the cell or subcell might be subdivided, or whether a label of the subcell may be changed to obstructed. For example, if a cell or subcell is labeled as free based on an occupancy metric calculated from the occupancy data identified at box 720, and if an occupancy metric calculated from the occupancy data and the dynamic activity data would exceed a predetermined threshold, the cell or subcell may be subdivided, e.g., into quadrants of equal sizes and identical shapes, such as is described above with respect to FIGS. 4A through 4G, unless further division or subdivision would result in a subcell that is smaller than an area required to accommodate the operational capabilities of the vehicle. If further division of such a cell or subcell labeled as free would result in a subcell smaller than such an area, then the label of the cell or subcell may be changed to obstructed. The dynamic occupancy map may be defined by aggregating the cells or subcells that have been labeled as obstructed, and by identifying the cells or subcells that have been labeled as free.

At box 770, a route for travel by the vehicle from the origin to the destination at the specified time is selected based on the dynamic occupancy map, e.g., through centroids of cells or subcells that are labeled as free, and the process ends.

Referring to FIGS. 8A through 8F, views of aspects of one system for route or path planning in accordance with embodiments of the present disclosure are shown. Except where otherwise noted, reference numerals preceded by the number "8" shown in FIGS. 8A through 8F indicate components or features that are similar to components or features having reference numerals preceded by the number "5" shown in FIGS. 5A and 5B, by the number "4" shown in FIGS. 4A through 4G, by the number "2" shown in FIG. 2 or by the number "1" shown in FIGS. 1A through 1G.

Figure 8A:
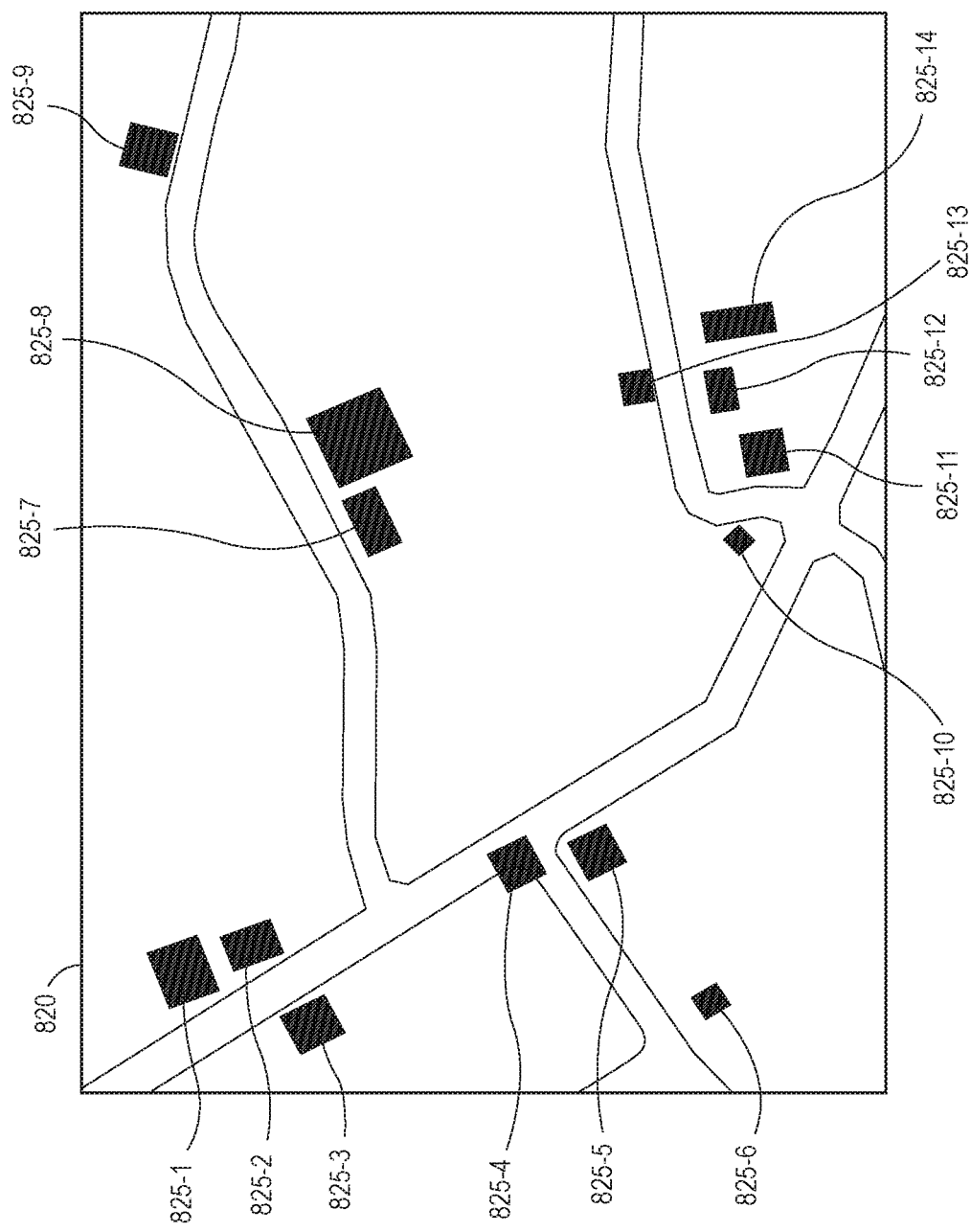

As is shown in FIG. 8A, a geographic map 820 of a region identifies locations of a plurality of buildings (or other structures) 825-1 through 825-14. The locations of the buildings 825-1 through 825-14 may be identified or determined on any basis, such as buildings having maximum areas (e.g., footprints) or heights greater than a predetermined threshold, or on any basis other than area or height.

As is shown in FIG. 8B, a static occupancy map 840-1 includes a plurality of large cells 832-1, 832-2, 832-3, a plurality of medium-sized cells 834-1 through 834-17, and a plurality of small cells 836-1 through 836-40 that have been labeled as free, e.g., by dividing the geographic map 820 into cells, calculating occupancy metrics based on locations and footprints of the buildings 825-1 through 825-14, and subdividing the cells into subcells based on values of the occupancy metrics, until further subdivision would result in subcells having areas smaller than an area defined for a vehicle based on its operational capabilities. The static occupancy map 840-1 further includes a plurality of sectors 845-1, 845-2, 845-3, 845-4, 845-5, 845-6 that have been identified as obstructed, based on occupancy metrics calculated from the locations and footprints of the buildings 825-1 through 825-14. Alternatively, the occupancy metrics from which the cells or subcells are labeled as obstructed or free may be calculated based on any other data. The static occupancy map 840-1 may be used to select a route comprising a plurality of paths for travel by the vehicle through the centroids of free cells and/or subcells within the occupancy map, e.g., as determined by a search algorithm such as an A* search algorithm.

As is shown in FIG. 8C, dynamic aerial activity including an actual or a planned route for travel by a vehicle 810-1 (e.g., an aerial vehicle, such as a drone) over the portion of the region shown in the geographic map 820 is shown. Alternatively, the dynamic aerial activity shown in FIG. 8C may include actual or planned routes for travel by any number of vehicles, in addition to the vehicle 810-1, as well as any aerial restrictions of a short-term or temporary nature. In some embodiments, the planned route for travel by the vehicle 810-1 may have been determined based on the static occupancy map 840-1 shown in FIG. 8B. In some other embodiments, the planned route for travel by the vehicle 810-1 may have been determined arbitrarily, or in any other manner.

Figure 8D:
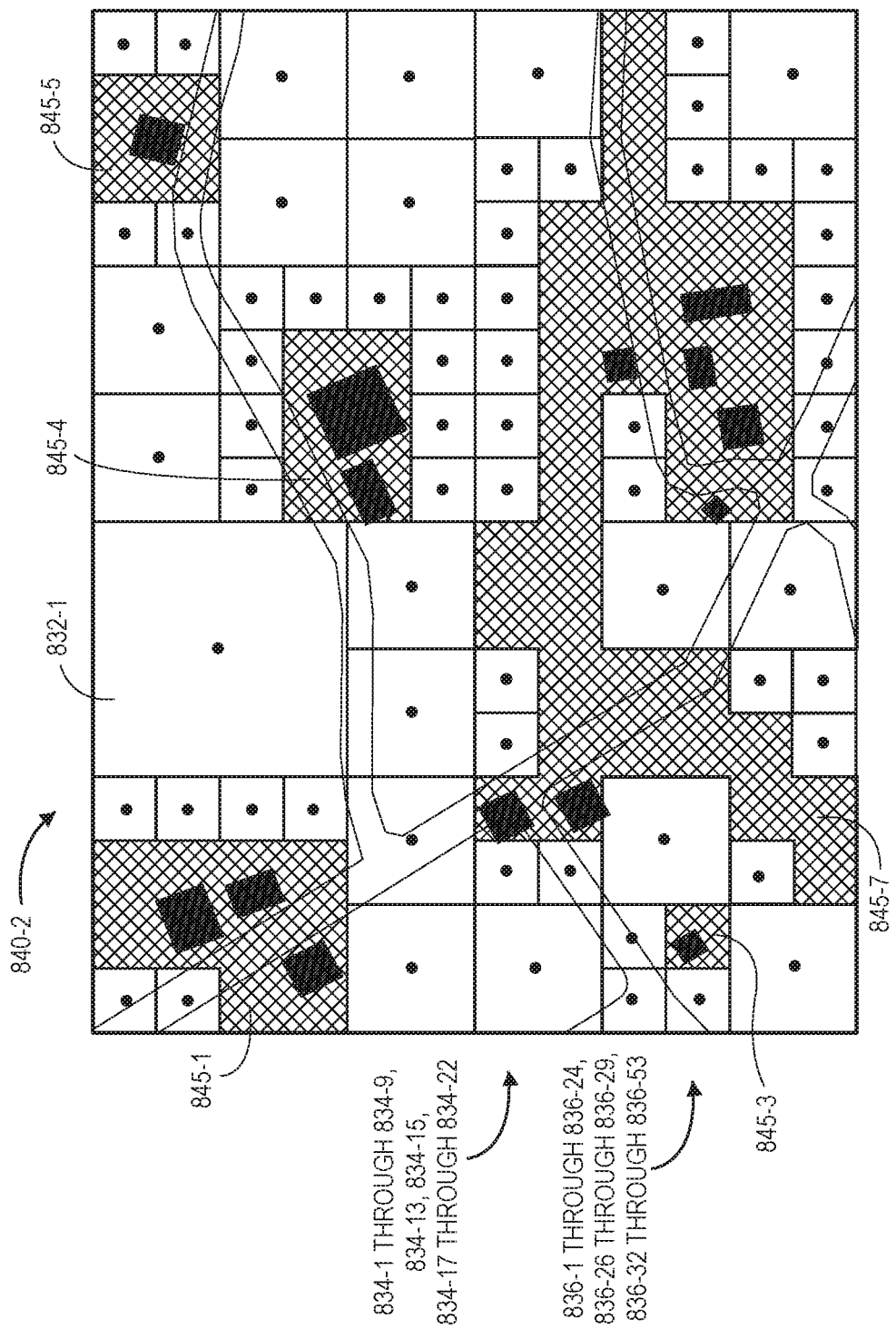

In accordance with embodiments of the present disclosure, a dynamic occupancy map may be defined based on occupancy data of a static nature identified for a region, or a static occupancy map derived from such data, e.g., the static occupancy map 840-1 of FIG. 8B, as well as dynamic aerial activity that is planned or actually occurring within the region, such as is shown in FIG. 8C. As is shown in FIG. 8D, a dynamic occupancy map 840-2 including the large cell

832-1, a plurality of medium-sized cells 834-1 through 834-9, 834-13, 834-15, 834-17 through 834-22, and a plurality of small cells 836-1 through 836-24, 836-26 through 836-29, 836-32 through 836-53 that have been labeled as free is shown. The dynamic occupancy map 840-2 further includes the sectors 845-1, 845-3, 845-4, 845-5, which had been identified as obstructed based on occupancy metrics calculated from the locations and footprints of the buildings 825-1 through 825-14, as shown in FIGS. 8A and 8B.

Additionally, the dynamic occupancy map 840-2 also includes a sector 845-7 formed from the recalculation of occupancy metrics and subdivision of cells based on the dynamic aerial activity shown in FIG. 8C. For example, as is shown in FIG. 8D, based on the occupancy metrics calculated from the locations and footprints of the buildings 825-1 through 825-14 shown in FIG. 8A and the dynamic aerial activity shown in FIG. 8C, the medium-sized cells 834-10, 834-11, 834-12, 834-14, 834-16 and the large cells 832-2, 832-3 of FIG. 8B have been further divided or subdivided into small cells and/or medium-sized cells, some of which have been labeled as obstructed along with the small cells 836-25, 836-30, 836-31 of FIG. 8B, and aggregated with the sectors 845-2, 845-6 to form the sector 845-7. Cells that are formed from division or subdivision and labeled as free may be added to the dynamic occupancy map 840-2, which may be used to select a route comprising a plurality of paths for travel by a vehicle through the centroids of free cells and/or subcells within the occupancy map 840-2, e.g., as determined by a search algorithm such as an A* search algorithm.

Figure 8E:
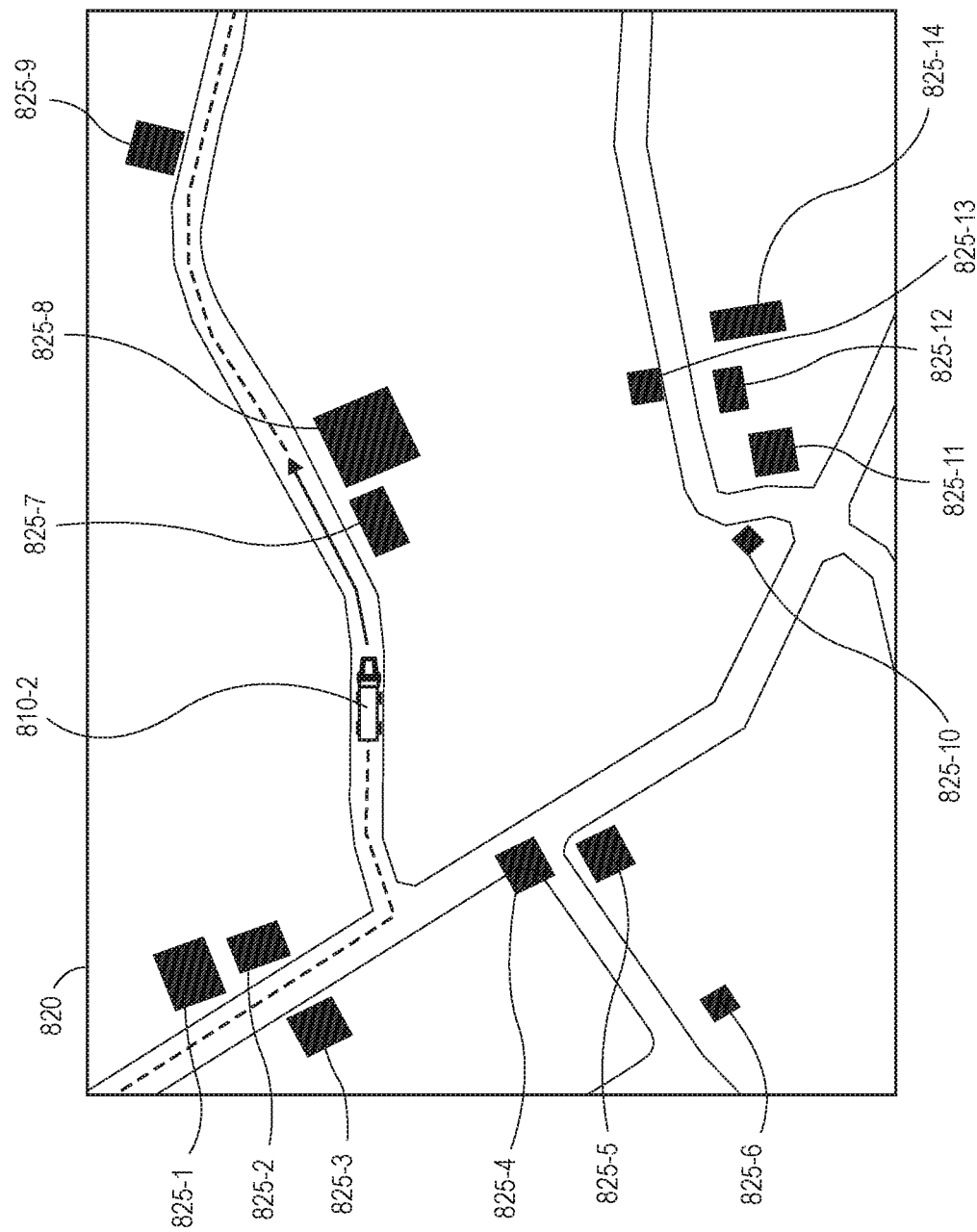

As is shown in FIG. 8E, dynamic ground activity including an actual or a planned route for travel by a vehicle 810-2 (e.g., a ground vehicle, such as a tractor-trailer, a van, a truck, a robot, or another vehicle) over the portion of the region shown in the geographic map 820 is shown. Alternatively, the dynamic ground activity shown in FIG. 8E may include actual or planned routes for travel by any number of vehicles, in addition to the vehicle 810-2, as well as any ground restrictions of a short-term or temporary nature. In some embodiments, the planned route for travel by the vehicle 810-2 may have been selected arbitrarily, or in any other manner.

In accordance with embodiments of the present disclosure, a dynamic occupancy map may also be defined based on occupancy data of a static nature identified for a region, or a static occupancy map derived from such data, e.g., the static occupancy map 840-1 of FIG. 8B, as well as dynamic ground activity that is planned or actually occurring within the region, such as is shown in FIG. 8E. As is shown in FIG. 8F, a dynamic occupancy map 840-3 including the large cells 832-2, 832-3, a plurality of medium-sized cells 834-1, 834-3, 834-10 through 834-17, 834-23, 834-24, and a plurality of small cells 836-1 through 836-6, 836-9, 836-13, 836-15 through 836-40, 836-54 through 836-69 that have been labeled as free is shown. The dynamic occupancy map 840-3 further includes the sectors 845-2, 845-3, 845-6, which had been identified as obstructed based on occupancy metrics calculated from the locations and footprints of the buildings 825-1 through 825-14, as shown in FIGS. 8A and 8B.

Additionally, the dynamic occupancy map 840-3 also includes a sector 845-8 formed from the recalculation of occupancy metrics and subdivision of cells based on the dynamic ground activity shown in FIG. 8E. For example, as is shown in FIG. 8F, based on the occupancy metrics calculated from the locations and footprints of the buildings 825-1 through 825-14 shown in FIG. 8A and the dynamic ground activity shown in FIG. 8E, the medium-sized cells 834-2, 834-4 through 834-8 and the large cell 832-1 of FIG. 8B have been further divided or subdivided into small cells and/or medium-sized cells, some of which have been labeled as obstructed along with the small cells 836-7, 836-8, 836-11 of FIG. 8B, and aggregated with the sectors 845-1, 845-5 to form the sector 845-8. Cells that are formed from division or subdivision and labeled as free may be added to the dynamic occupancy map 840-3, which may be used to select a route comprising a plurality of paths for travel by a vehicle through the centroids of free cells and/or subcells within the occupancy map 840-3, e.g., as determined by a search algorithm such as an A* search algorithm.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, those of ordinary skill in the pertinent arts will recognize that occupancy metrics may be calculated based on any type or form of data that is intrinsic to a geospatial area or geographic region, and are not limited to specific features within such regions. For example, in some embodiments, a number or a density of physical features (e.g., buildings or other structures, as well as natural features such as hills, mountains, trees or valleys), concentrations of humans or other animals, or other things may be considered in predicting one or more localized occupancy metrics. Information or data regarding geographic regions, cells, ground features, populations or other aspects may be obtained from any source in accordance with embodiments of the present disclosure.

Occupancy maps that are generated in accordance with embodiments of the present disclosure may be utilized in any application in which a route or path travel over, around or through a region is to be determined based on occupancy, and need not be limited to any specific application disclosed herein. The systems and methods of the present disclosure may be utilized in connection with travel by any type or form of vehicle, and are not limited for use by aerial vehicles (e.g., manned or unmanned) in general, or unmanned aerial vehicles in particular. Moreover, the term "cell" may refer to both an original division of a map or a region, and also to any portion of the map or region defined by a subsequent division of another cell (e.g., a "subcell"), such that every "subcell" is also a "cell."

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3, 6 or 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale. In particular, the one or more of the models of exposure to noise are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
    an aerial vehicle;
    a computer connected to a network, wherein the computer is in communication with the aerial vehicle,
    wherein the computer is programmed with one or more instructions that, when executed, cause the computer to at least:
        identify a geographic map of a region;
        receive occupancy data for the region, wherein the occupancy data is determined for the region based at least in part on at least one of:
            geographic information system data for the region;
            digital elevation model data for the region;
            digital terrain model data for the region;
            at least one orthoimage of the region;
            aerial activity over the region; or
            ground activity in the region; and
            wherein the occupancy data comprises areas of ground structures within the region and locations of the ground structures within the region;
        divide the geographic map of the region into a plurality of cells, wherein each of the plurality of cells is a square having a common area; wherein dividing the geographic map of the region into the plurality of cells comprises:
            identifying at least one of an edge or a corner of one of the ground structures within the region; and
            applying a grid to the geographic map,
            wherein the grid comprises a plurality of lines, wherein at least two of the lines intersect, and wherein at least one of the plurality of lines is aligned along the at least one of the edge or at the corner;
        determine occupancy metrics of each of the plurality of cells based at least in part on the occupancy data;
            wherein determining the occupancy metrics for each of the plurality of cells comprises:
            determining, for each of the plurality of cells, an area of the ground structures within one of the plurality of cells,
            wherein each of the occupancy metrics determined for each of the plurality of cells is a ratio of the area of the ground structures within the one of the plurality of cells to the common area;
        identify a first number of the plurality of cells having occupancy metrics above a first threshold;
        label each of the first number of the plurality of cells as obstructed;
        identify a second number of the plurality of cells having occupancy metrics below a second threshold;
        label each of the second number of the plurality of cells as free;
        derive a first plurality of subcells from a third number of the plurality of cells, wherein each of the first plurality of subcells is a quadrant of one of the third number of the plurality of cells;
        identify a fourth number of the first plurality of subcells having occupancy metrics above the first threshold;
        label each of the fourth number of the first plurality of subcells as obstructed;
        identify a fifth number of the first plurality of subcells having occupancy metrics below the second threshold;
        label each of the fifth number of the first plurality of subcells as free;
        derive an occupancy map for the region, wherein the occupancy map comprises labels of each of the first number of cells and the fourth number of subcells as obstructed, and wherein the occupancy map comprises labels of each of the second number of cells and the fifth number of subcells as free;
        determine a route for the aerial vehicle based at least in part on the occupancy map, wherein the route comprises a path between a first centroid of one of the second number of cells or the fifth number of subcells and a second centroid of one of the second number of cells or the fifth number of subcells; and program the aerial vehicle with instructions for traveling from the first centroid to the second centroid via the at least one path.

2. The system of claim 1, wherein the one or more instructions, when executed, further cause the computer to at least:
determine at least one operational capability of the aerial vehicle, wherein the at least one operational capability of the aerial vehicle is one of:
a velocity of the aerial vehicle;
an acceleration of the aerial vehicle; or
an altitude of the aerial vehicle; and
calculate an area for the aerial vehicle based at least in part on the at least one operational capability of the aerial vehicle;
identify at least one of the first plurality of subcells having an occupancy metric below the first threshold and above the second threshold;
in response to identifying the at least one of the first plurality of subcells having the occupancy metric below the first threshold and above the second threshold,
determine that the area calculated for the aerial vehicle is greater than one-quarter of a common area of each of the first plurality of subcells;
derive a second plurality of subcells from the at least one of the first plurality of subcells, wherein each of the second plurality of subcells is a quadrant of the one of the first plurality of subcells;
identify a sixth number of the second plurality of subcells having occupancy metrics above the first threshold;
label each of the sixth number of the second plurality of subcells as obstructed;
identify a seventh number of the second plurality of subcells having occupancy metrics below the second threshold; and
label each of the seventh number of the second plurality of subcells as free,
wherein the occupancy map further comprises labels of each of the sixth number of subcells as obstructed, and wherein the occupancy map further comprises labels of each of the seventh number of subcells as free.

3. The system of claim 1, wherein each of the occupancy metrics of each of the plurality of cells is a ratio of a building footprint area of the ground structures of a respective one of the plurality of cells to the common area of the plurality of cells, and
wherein each of the occupancy metrics of the first plurality of subcells is a ratio of a building footprint of a respective one of the first plurality of subcells to the common area of the first plurality of subcells.

4. The system of claim 1,
wherein identifying the at least one of an edge or a corner of one of the ground structures within the region further comprises identifying at least one of an edge of a building within the region or a road within the region;
wherein at least one of the plurality of lines is aligned along the at least one of the edge of the building or the road; and
wherein the geographic map of the region is divided into the plurality of cells by the grid.

5. A method comprising:
determining occupancy data for a region at a first time; wherein the occupancy data is determined for the region at the first time based at least in part on at least one of:
geographic information system data for at least a portion of the region;
digital elevation model data for at least the portion of the region;
digital terrain model data for at least the portion of the region;
at least one orthoimage of at least the portion of the region;
aerial activity over at least the portion of the region at the first time; or
ground activity in at least the portion of the region at the first time; and
wherein the occupancy data comprises areas of ground structures within the region and locations of the ground structures within the region;
dividing at least a portion of a geographic map of the region into a first plurality of cells, wherein each of the first plurality of cells has a first common area; wherein dividing at least the portion of the geographic map of the region into the first plurality of cells comprises:
identifying at least one of an edge or a corner of one of the ground structures within the region; and
applying a grid to the geographic map,
wherein the grid comprises a plurality of lines, wherein at least two of the lines intersect, and wherein at least one of the plurality of lines is aligned along the at least one of the edge or at the corner;
calculating occupancy metrics for each of the first plurality of cells at the first time based at least in part on the occupancy data; wherein calculating the occupancy metrics for each of the first plurality of cells at the first time comprises:
determining, for each of the first plurality of cells, an area of the ground structures within one of the first plurality of cells,
wherein each of the occupancy metrics calculated for each of the first plurality of cells at the first time is a ratio of the area of the ground structures within the one of the first plurality of cells to the first common area;
determining that the occupancy metric of at least a first cell of the first plurality of cells exceeds a first predetermined threshold at the first time;
dividing at least the first cell into a second plurality of cells, wherein each of the second plurality of cells is a subcell of the first cell, and wherein each of the second plurality of cells has a second common area;
calculating occupancy metrics for each of the second plurality of cells at the first time based at least in part on the occupancy data; and
generating an occupancy map of the region based at least in part on at least a portion of the geographic map, an occupancy metric of a second cell of the first plurality of cells, and an occupancy metric of at least a third cell of the second plurality of cells,
wherein the occupancy map comprises a label of the second cell at the first time as one of obstructed or free, and
wherein the occupancy map further comprises a label of the third cell at the first time as one of obstructed or free.

6. The method of claim 5, further comprising:
determining at least one operational capability of a vehicle, wherein the at least one operational capability of the vehicle is one of:
- a velocity of the vehicle, wherein the velocity is one of an average velocity, a nominal velocity, a maximum velocity or within a range of velocities;
- an acceleration of the vehicle, wherein the acceleration is one of an average acceleration, a nominal acceleration, a maximum acceleration or within a range of accelerations; or
- a turn radius of the vehicle, wherein the turn radius is one of an average turn radius, a nominal turn radius, a maximum turn radius or within a range of turn radii; and calculating an area for the vehicle based at least in part on the at least one operational capability of the vehicle,
wherein the method further comprises:
determining that the area calculated for the vehicle is less than the second common area, and
wherein the occupancy map is generated in response to determining that the area calculated for the vehicle is less than the second common area.

7. The method of claim 5,
determining at least one operational capability of a vehicle, wherein the at least one operational capability of the vehicle is one of:
- a velocity of the vehicle, wherein the velocity is one of an average velocity, a nominal velocity, a maximum velocity or within a range of velocities;
- an acceleration of the vehicle, wherein the acceleration is one of an average acceleration, a nominal acceleration, a maximum acceleration or within a range of accelerations; or
- a turn radius of the vehicle, wherein the turn radius is one of an average turn radius, a nominal turn radius, a maximum turn radius or within a range of turn radii; and calculating an area for the vehicle based at least in part on the at least one operational capability of the vehicle,
wherein generating the occupancy map of the region further comprises:
determining that the occupancy metric of at least the third cell does not exceed the first predetermined threshold at the first time;
in response to determining that the occupancy metric of at least the third cell does not exceed the first predetermined threshold at the first time,
  dividing the third cell into a third plurality of cells, wherein each of the third plurality of cells is a subcell of the third cell, and wherein each of the third plurality of cells has a third common area;
  calculating occupancy metrics for each of the third plurality of cells based at least in part on the occupancy data;
  determining that the area calculated for the vehicle is greater than a fourth common area of a fourth plurality of cells, wherein each of the fourth plurality of cells is a subcell of a fourth cell of the third plurality of cells, and
  wherein the occupancy map is generated in response to determining that the area calculated for the vehicle is greater than the fourth common area.

8. The method of claim 5, further comprising:
determining that the occupancy metric of at least the first cell is less than a second predetermined threshold at the first time,
wherein at least the first cell of the first plurality of cells is divided into the second plurality of cells after determining that the occupancy metric of at least the first cell exceeds the first predetermined threshold at the first time and after determining that the occupancy metric of at least the first cell is less than the second predetermined threshold at the first time.

9. The method of claim 8, wherein generating the occupancy map of the region further comprises:
identifying a first subset of the first plurality of cells and a second subset of the second plurality of cells having occupancy metrics greater than the first predetermined threshold;
identifying a third subset of the first plurality of cells and a fourth subset of the second plurality of cells having occupancy metrics less than the second predetermined threshold; and
aggregating adjacent cells of the first subset and cells of the second subset having occupancy metrics greater than the first predetermined threshold into at least a first sector;
wherein the occupancy map includes at least the first sector, cells of the third subset and cells of the fourth subset.

10. The method of claim 5, wherein the second common area is not less than an area defined based at least in part on at least one operating capability of a vehicle, and
wherein the method further comprises:
generating a route for the vehicle based at least in part on the occupancy map, wherein the route comprises a path between a first centroid of one of the first plurality of cells or one of the second plurality of cells and a second centroid of one of the first plurality of cells or one of the second plurality of cells;
selecting at least one of a course, a speed, or an altitude for traveling along the route or the path; and
programming the route and at least one of the course, the speed, the altitude or the occupancy map into at least one memory storage component of the vehicle.

11. The method of claim 10, wherein at least the path is generated according to an A* search algorithm.

12. The method of claim 10, further comprising:
receiving an order for a delivery of an item to a location within the region,
wherein the route is generated in response to receiving the order,
wherein an origin of the route is at a source of the item, and
wherein a destination of the route is associated with the location.

13. The method of claim 5,
wherein calculating the occupancy metrics for each of the second plurality of cells at the first time comprises:
determining, for each of the second plurality of cells, an area of the ground structures within one of the second plurality of cells,
wherein each of the occupancy metrics calculated for each of the second plurality of cells at the first time is a ratio of the area of the ground structures within the one of the second plurality of cells to the second common area.

14. The method of claim 5, wherein dividing at least the first cell of the first plurality of cells into the second plurality of cells comprises:
dividing the first cell into four cells, wherein the second plurality of cells consists of the four cells.

15. The method of claim 5, wherein each of the first plurality of cells has a shape of a square, and
  wherein the second common area is one-quarter of the first common area.
16. The method of claim 5, wherein the label of the third cell at the first time is free, and
  wherein the method further comprises:
    determining information regarding activity occurring within at least the third cell at a second time, wherein the second time follows the first time;
    calculating an occupancy metric for the third cell at the second time based at least in part on the occupancy data and the information regarding the activity occurring within the third cell at the second time;
    determining that the occupancy metric for the third cell at the second time exceeds the first predetermined threshold; and
    in response to determining that the occupancy metric for the third cell at the second time exceeds the first predetermined threshold,
      updating the occupancy map, wherein updating the occupancy map comprises labeling the third cell as obstructed.
17. An aerial vehicle comprising:
  at least one propulsion motor; and
  a control system having at least one computer processor, wherein the control system is in communication with the at least one propulsion motor,
  wherein the control system is programmed with one or more sets of instructions that, when executed by the at least one computer processor, cause the aerial vehicle to at least:
    receive data comprising a geographic map of a region and occupancy data for the region, wherein the occupancy data comprises areas of ground structures within the region and locations of the ground structures within the region; and wherein the occupancy data is based at least in part on at least one of:
      geographic information system data for at least a portion of the region;
      digital elevation model data for at least the portion of the region;
      digital terrain model data for at least the portion of the region;
      at least one orthoimage of at least the portion of the region;
      aerial activity over at least the portion of the region; or
      ground activity in at least the portion of the region;
    divide at least a portion of the geographic map into a first plurality of cells, wherein each of the first plurality of cells has a first common area; and wherein dividing at least the portion of the geographic map of the region into the first plurality of cells comprises:
      identifying at least one of an edge or a corner of one of the ground structures within the region; and
      applying a grid to the geographic map,
        wherein the grid comprises a plurality of lines, wherein at least two of the lines intersect, and wherein at least one of the plurality of lines is aligned along the at least one of the edge or at the corner;
    determine areas of the ground structures within each of the first plurality of cells based at least in part on the occupancy data;
    calculate occupancy metrics for each of the first plurality of cells based at least in part on the areas of the ground structures within each of the first plurality of cells and the first common area; wherein each of the occupancy metrics calculated for each of the first plurality of cells is a ratio of the area of the ground structures within a respective one of the first plurality of cells to the first common area;
    identify at least a first cell of the first plurality of cells having a population metric above a first predetermined threshold;
    identify at least a second cell of the first plurality of cells having a population metric below a second predetermined threshold;
    identify at least a third cell of the first plurality of cells having a population metric between the first predetermined threshold and the second predetermined threshold;
    divide at least the third cell into a second plurality of cells, wherein each of the second plurality of cells has a second common area that is one-quarter of the first common area;
    determine areas of the ground structures within each of the second plurality of cells based at least in part on the occupancy data;
    calculate occupancy metrics for each of the second plurality of cells based at least in part on the areas of the ground structures within each of the second plurality of cells and the second common area;
    identify at least a fourth cell of the second plurality of cells having a population metric above the first predetermined threshold, wherein the fourth cell is adjacent to the first cell;
    identify at least a fifth cell of the second plurality of cells having a population metric below the second predetermined threshold;
    aggregate at least the first cell and the fourth cell into a first sector; and
    generate an occupancy map comprising:
      the first sector;
      the second cell; and
      the fifth cell.
18. The aerial vehicle of claim 17, wherein the one or more sets of instructions, when executed by the at least one computer processor, cause the aerial vehicle to at least:
    define an area associated with the aerial vehicle based at least in part on at least one of a velocity of the aerial vehicle or an acceleration of the aerial vehicle;
    identify at least a sixth cell of the second plurality of cells having a population metric between the first predetermined threshold and the second predetermined threshold;
    determine that one-quarter of the second common area is greater than the area associated with the aerial vehicle;
    in response to determining that one-quarter of the second common area is greater than the area associated with the aerial vehicle,
      divide at least the sixth cell into a third plurality of cells, wherein each of the third plurality of cells has a third common area that is one-quarter of the second common area;
      determine areas of the ground structures within each of the third plurality of cells based at least in part on the occupancy data;
      calculate occupancy metrics for each of the third plurality of cells based at least in part on the areas of the ground structures within each of the third plurality of cells and the third common area;

identify at least a seventh cell of the third plurality of cells having a population metric above the first predetermined threshold; and identify at least an eighth cell of the third plurality of cells having a population metric below the second predetermined threshold, wherein the first sector comprises the seventh cell, and wherein the occupancy map further comprises the eighth cell.

* * * * *